US009710971B2

United States Patent
Komatsu

(10) Patent No.: US 9,710,971 B2
(45) Date of Patent: Jul. 18, 2017

(54) INFORMATION PROCESSING DEVICE, POSITION DESIGNATION METHOD AND STORAGE MEDIUM

(71) Applicant: FUJITSU LIMITED, Kawasaki-shi, Kanagawa (JP)

(72) Inventor: Ryouta Komatsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/310,576

(22) Filed: Jun. 20, 2014

(65) Prior Publication Data

US 2015/0029180 A1    Jan. 29, 2015

(30) Foreign Application Priority Data

Jul. 24, 2013    (JP) .................................. 2013-153995

(51) Int. Cl.
*G06T 19/00*    (2011.01)
*G06K 9/00*    (2006.01)
(Continued)

(52) U.S. Cl.
CPC ........ *G06T 19/006* (2013.01); *G06K 9/00671* (2013.01); *G06K 9/228* (2013.01);
(Continued)

(58) Field of Classification Search
CPC ......... G06T 19/00; G06T 19/006; G06T 7/74; G06T 2207/30108; G06T 2207/30244;
(Continued)

(56) References Cited

U.S. PATENT DOCUMENTS 6,373,508 B1 * 4/2002 Moengen ................ G01S 3/786
  342/453
8,850,337 B2 * 9/2014 Ooi ........................ G06T 19/006
  715/757
(Continued)

FOREIGN PATENT DOCUMENTS

EP    2 490 182 A1    8/2012
JP    2005-250734    9/2005
(Continued)

OTHER PUBLICATIONS

Office Action issued Aug. 5, 2015 in Australian Patent Application No. 2014203440.
(Continued)

*Primary Examiner* — Abderrahim Merouan
(74) *Attorney, Agent, or Firm* — Oblon, McClelland, Maier & Neustadt, L.L.P.

(57) ABSTRACT

An information processing device includes: a memory; and a processor coupled to the memory and configured to: calculate, based on a figure of a reference object recognized from a first input image, position information with respect to the reference object, the positional information indicating an image-capturing position of the first input image, and generate setting information in which display data is associated with the position information with respect to the reference object as a display position of the display data, the display data being displayed based on the setting information when the reference object is recognized from a second input image different from the first input image.

19 Claims, 23 Drawing Sheets

(51) Int. Cl.
*G06K 9/22* (2006.01)
*G06T 7/73* (2017.01)

(52) U.S. Cl.
CPC ...... *G06T 7/74* (2017.01); *G06T 2207/30108* (2013.01); *G06T 2207/30244* (2013.01)

(58) Field of Classification Search
CPC ....... G06F 3/011; G06F 3/012; G02B 27/017; G06K 9/00671; G06K 9/228
See application file for complete search history.

(56) References Cited

U.S. PATENT DOCUMENTS

| | | | | |
|---|---|---|---|---|
| 2003/0080978 | A1* | 5/2003 | Navab | G01S 5/16 345/633 |
| 2006/0013436 | A1* | 1/2006 | Takahashi | G06Q 10/00 382/100 |
| 2007/0118739 | A1 | 5/2007 | Togashi et al. | |
| 2008/0310686 | A1 | 12/2008 | Kretz | |
| 2011/0298823 | A1* | 12/2011 | Kitahara | G06T 19/006 345/632 |
| 2011/0304703 | A1* | 12/2011 | Ito | G06T 19/006 348/47 |
| 2012/0210255 | A1* | 8/2012 | Ooi | G06T 19/006 715/762 |
| 2012/0327236 | A1* | 12/2012 | Kiyohara | G06K 9/00369 348/148 |
| 2013/0016123 | A1 | 1/2013 | Skarulis | |
| 2013/0108108 | A1 | 5/2013 | Oi et al. | |

FOREIGN PATENT DOCUMENTS

| | | |
|---|---|---|
| JP | 2008-304268 | 12/2008 |
| JP | 2010-531089 | 9/2010 |
| JP | 2012-168798 | 9/2012 |
| JP | 2013-164696 A | 8/2013 |
| WO | WO 2005/119539 A1 | 12/2005 |

OTHER PUBLICATIONS

Extended European Search Report issued Jan. 7, 2015 in Patent Application No. 14175198.2.
Pedro de-Las-Heras-Quiros, et al., "Mobile Augmented Reality browsers should allow labeling objects a Position Paper for the Augmented Reality on the Web W3C Workshop", May 30, 2010, XP 055009480, Retrieved from the Internet: URL:http://www.w3.org/2010/06/w3car/mar_browsers_should_allow_labeling)objects.pdf [retrieved on Oct. 13, 2011], 5 pages.
Anders Henrysson, et al., "Mobile Phone Based AR Scene Assembly", Proceedings of the 4th International Conference on Mobile and Ubiquitous Multimedia, MUM '05, XP 055026944, Jan. 1, 2005, pp. 95-102.
Tobias Langlotz, et al., "Sketching up the world: in situ authoring for mobile Augmented Reality", Personal and Ubiquitous Computing, vol. 16, No. 6, Springer Verlag, XP 035089423, Jul. 27, 2011, pp. 623-630.
Jason Wither, et al. "Pictorial Depth Cues for Outdoor Augmented Reality", Proceedings of the 2005 Ninth IEEE International Symposium on Wearable Computers (ISWC'05), XP 010859535, (Oct. 18, 2005), pp. 92-99.
Michael Rohs, "Marker-Based Embodied Interaction for Handheld Augmented Reality Games", Journal of Virtual Reality and Broadcasting, vol. 4, No. 5, XP 055136655, May 8, 2007, 12 pages.
Office Action issued on Aug. 24, 2016 in European Patent Application No. 14 175 198.2.
Combined Chinese Office Action and Search Report issued on Aug. 31, 2016 in Patent Application No. 201410341816.0 (with English translation).
Office Action issued Mar. 28, 2017 in Japanese Patent Application No. 2013-153995 (with unedited computer generated English translation).

\* cited by examiner

FIG. 3

$$M = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 4

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 12

| MARKER ID | Xc | Yc | Zc | Pc | Qc | Rc | CONTENT ADDITION FLAG |
|---|---|---|---|---|---|---|---|
| 100 | X1c | Y1c | Z1c | P1c | Q1c | R1c | 1 |
| ... | ... | ... | ... | ... | ... | ... | ... |
|  |  |  |  |  |  |  |  |

FIG. 13

| TEMPLATE ID | | 10 | |
|---|---|---|---|
| VERTEX COORDINATES | 0 | (0, 0, 0) | T21 |
| | 1 | (X3m, Y3m, Z3m) | |
| | 2 | (X4m, Y4m, Z4m) | |
| | 3 | (X5m, Y5m, Z5m) | |
| | 4 | (X6m, Y6m, Z6m) | |
| | 5 | ... | |
| | 6 | ... | |
| | 7 | ... | |
| | ... | ... | |
| 1 | ORDER OF VERTICES | 1, 3, 4, 5, 7 | T22 |
| | TEXTURE ID | 21 | |
| 2 | ORDER OF VERTICES | 2, 3, 4, 5, 6 | |
| | TEXTURE ID | 21 | |
| ... | ORDER OF VERTICES | ... | |
| | TEXTURE ID | ... | |

FIG. 14

| CONTENT ID | Xm | Ym | Zm | Pm | Qm | Rm | Jx | Jy | Jz | TEMPLATE ID | MARKER ID | ADDITIONAL INFORMATION |
|---|---|---|---|---|---|---|---|---|---|---|---|---|
| 1000 | 20 | 25 | 10 | 0.0 | 0.0 | 0.0 | 1.0 | 1.0 | 1.0 | 10 | 100 | text: CRACK! |
| ... | ... | ... | ... | ... | ... | ... | ... | ... | ... | ... | ... | ... |

T3

INFORMATION PROCESSING DEVICE, POSITION DESIGNATION METHOD AND STORAGE MEDIUM

CROSS-REFERENCE TO RELATED APPLICATION

This application is based upon and claims the benefit of priority from the prior Japanese Patent Application No. 2013-153995 filed on Jul. 24, 2013, the entire contents of which are incorporated herein by reference.

FIELD

The techniques described in the present embodiments are related to techniques for designating a position in a virtual space.

BACKGROUND

Model data of a three-dimensional object arranged in a three-dimensional virtual space corresponding to a real space is displayed in such a manner that the model data is overlaid on a captured image taken by an imaging device. This technology expands information collected through human perception, such as visual perception, and thus is called augmented reality (AR) technology, for example. The model data of a three-dimensional object arranged in a three-dimensional virtual space corresponding to the real space is called AR content. Note that model data of a three-dimensional object is also called an object.

AR content is information in which it is defined in advance what kind of object is to be arranged in what attitude at what position in a three-dimensional space. Accordingly, with AR technology, a projection image of an AR object may be generated based on arrangement defined in advance, and the projection image may be displayed in such a manner as to be overlaid on a captured image. Note that a projection image of an AR object is generated based on the positional relationship between an imaging device and an AR content.

In order to determine the positional relationship between an imaging device and an AR content, a reference object is used. For example, it is typical to use an AR marker as a reference object. That is, when an AR marker is detected from a captured image taken by an imaging device, the positional relationship between the AR marker and the imaging device is determined based on a figure of the AR marker that appears in the captured image of the imaging device. Then, reflecting the positional relationship, a projection image of the object of AR content associated with the AR marker is generated, and that projection image is displayed in such a manner that it is overlaid on the captured image (for example, Japanese National Publication of International Patent Application No. 2010-531089, International Publication Pamphlet No. WO 2005-119539).

Here, in order to display the AR content in such a manner as to be overlaid on the captured image, operations of creating AR content (also referred to as authoring) have to be performed in advance. Note that the operations of creating AR content are operations that generate an object and set information on arrangement of that object in a three-dimensional space. Note that the information on arrangement is a relative position and an attitude when measured with respect to the reference object.

Here, there is an information processing device that arranges a virtual object at a three-dimensional position corresponding to a designated position designated by the user on a plane including a face, which is a face of an object model in the real space reflected in an input image and is designated by the user (Japanese Laid-open Patent Publication No. 2012-168798). That is, the information processing device may arrange a virtual object on the plane of the object model existing in the real space in accordance with the user's instruction for the designated position.

SUMMARY

According to an aspect of the invention, an information processing device includes: a memory; and a processor coupled to the memory and configured to: calculate, based on a figure of a reference object recognized from a first input image, position information with respect to the reference object, the positional information indicating an image-capturing position of the first input image, and generate setting information in which display data is associated with the position information with respect to the reference object as a display position of the display data, the display data being displayed based on the setting information when the reference object is recognized from a second input image different from the first input image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts a transformation matrix M from the marker coordinate system to the camera coordinate system, and a rotation matrix R in the transformation matrix M;

FIG. 4 depicts rotation matrices R1, R2, and R3;

FIG. 12 illustrates a marker management table T1;

FIG. 13 illustrates a template information table T2;

FIG. 14 illustrates an AR content information table T3;

DESCRIPTION OF EMBODIMENTS

Figure 1:
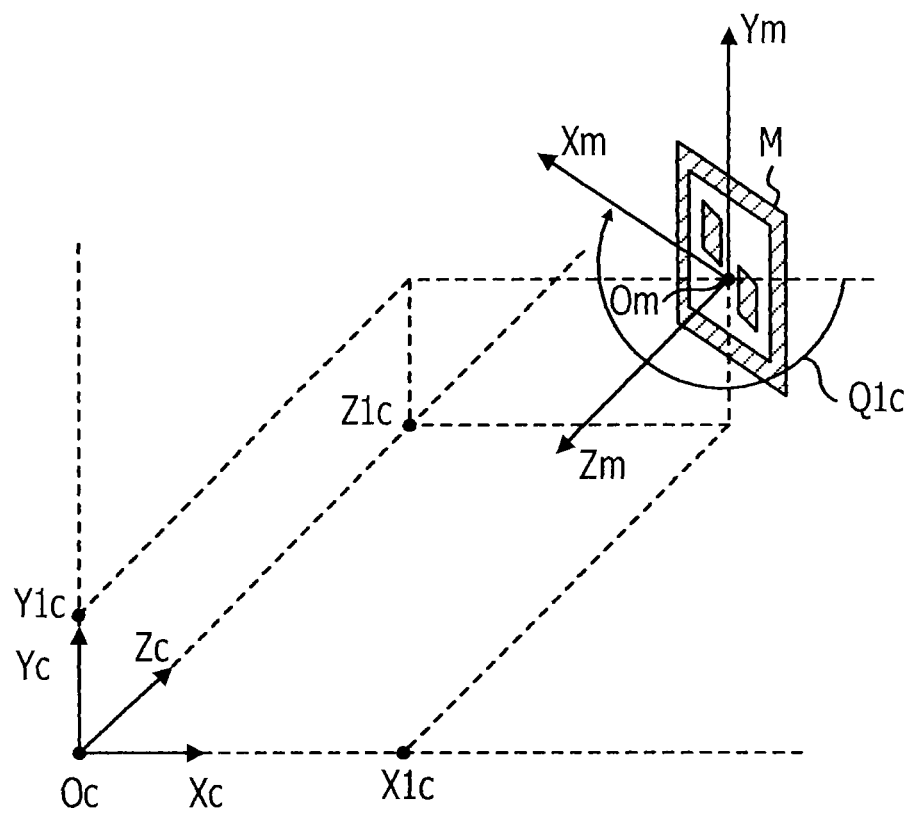
FIG. 1 illustrates the relationship between a camera coordinate system and a marker coordinate system.

The aforementioned information processing device can perform authoring for arranging a virtual object on a face of an object existing in the real space by preparing model data defining that face. However, in cases where it may be wished to arrange virtual objects on faces of various objects with a high degree of flexibility, it is difficult to generate model data for each face of an object on which a virtual object is to be arranged.

The information processing device can accept an offset for changing the arrangement position of a virtual object, from a face of a real object defined by model data. However, operations have to be performed under the condition that the operator understands how much offset is to be given in order to enable the arrangement position of the object to be changed to a desired position in the real space.

Accordingly, it is an object of the techniques disclosed herein to more simply designate a position at which an object is to be arranged when AR content is created.

Hereinafter, detailed embodiments of the present disclosure will be described. It is to be noted that embodiments described below may be combined appropriately as long as no contradictions arise among the contents of processing. Each embodiment will be described hereinafter with reference to the drawings.

To begin with, AR technology will be described in which an AR object arranged in a three-dimensional virtual space corresponding to a real space is displayed in such a manner that the AR object is overlaid on a captured image taken by a camera. The AR object is model data of a three-dimensional object arranged in the virtual space. Additionally, AR content is information that defines what kind of AR object is arranged in what manner in the virtual space.

The AR object is model data including a plurality of points, for example. A pattern (texture) is set for each of a plurality of faces acquired by interpolating a plurality of points with straight lines and curves, and a three-dimensional model is formed by combining the plurality of faces. The AR object is arranged in a virtual space by defining coordinates of all the points constituting the AR object with respect to a reference object existing in the real space. The object does not exist at a position of the coordinates of all the points in the real space, and the coordinates of all the points are defined in the virtual space with respect to the reference object.

While the AR object is arranged in a virtual space, the relationship in terms of position between a camera and a reference object in the real space is determined based on a visual appearance (figure) of the reference object that appears in a captured image taken by the camera. Using the coordinates in the virtual space with respect to the reference object existing in the real space as well as the relationship in terms of position between the camera and the reference object in the real space, the relationship in terms of position between the camera and the coordinates of all the points of the AR object in a three-dimensional virtual space corresponding to the real space is determined.

Based on these relationships in terms of position, the figure of the AR object obtained when the camera captures an image of the AR object is determined. That is, the AR content overlaid on the captured image is displayed. Operations for calculating the figure of the AR object will be further described with reference to FIG. 1, FIG. 2, FIG. 3, and FIG. 4.

FIG. 1 illustrates the relationship between a camera coordinate system and a marker coordinate system. A marker M exemplified in FIG. 1 is an exemplary reference object. The marker M illustrated in FIG. 1 is square-shaped, and its size is determined in advance (for example, the length of one side is 5 cm). Note that although the marker M illustrated in FIG. 1 is square-shaped, another object having a shape with which the relative position from a camera and the orientation can be determined even based on a figure obtained by image capturing from any viewpoint among a plurality of viewpoints may be used as a reference object. For example, a feature point generated from a captured image, or the like, may be used as a reference object.

The camera coordinate system includes three dimensions of (Xc, Yc, Zc), and uses, for example, the focus of a camera as the origin (origin Oc). For example, an Xc-Yc plane of the camera coordinate system is a face parallel to the face of an imaging device of the camera, and a Zc axis is an axis perpendicular to the face of the imaging device.

The marker coordinate system includes three dimensions of (Xm, Ym, Zm), and, for example, uses the center of the marker M as the origin (origin Om). For example, an Xm-Ym plane of the marker coordinate system is a face parallel to the marker M, and a Zm axis is perpendicular to the face of the marker M. The origin Om is represented by coordinates V1c (X1c, Y1c, Z1c) in the camera coordinate system.

Additionally, the angle of rotation of the marker coordinate system (Xm, Ym, Zm) relative to the camera coordinate system (Xc, Yc, Zc) is represented by rotational coordinates G1c (P1c, Q1c, R1c). P1c is the angle of rotation about the Xc axis, Q1c is the angle of rotation about the Yc axis, and R1c is the angle of rotation about the Zc axis. The marker coordinate system exemplified in FIG. 1 rotates only about the Ym axis, and therefore P1c and R1c are zero. Note that each angle of rotation is calculated based on what figure the reference object having a known shape is captured as, in a captured image to be processed.

Figure 2:
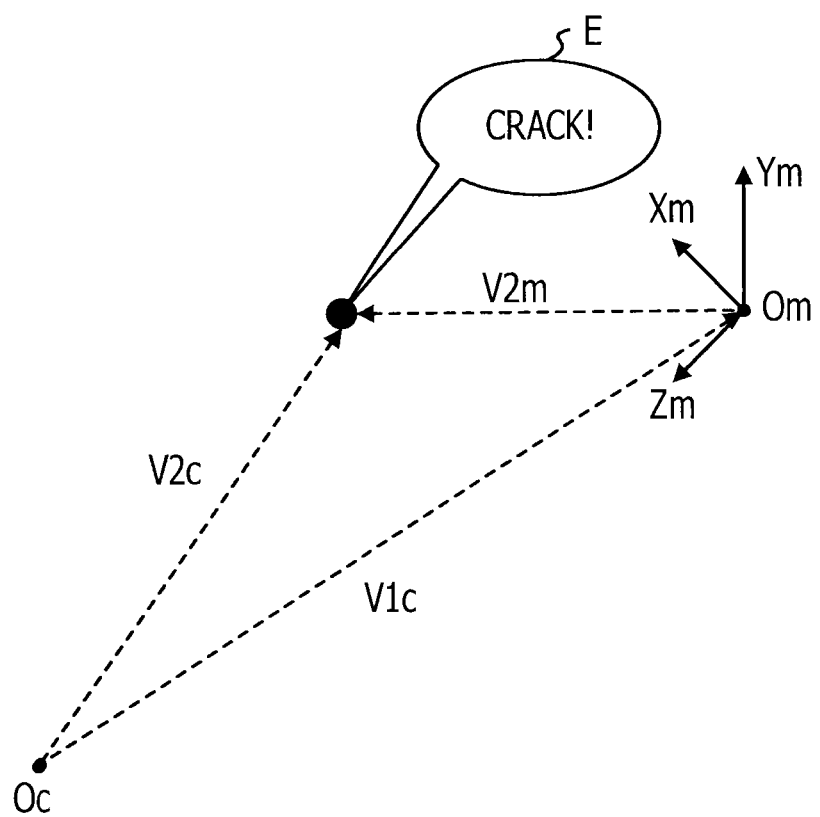
FIG. 2 illustrates an example of an AR object E in the camera coordinate system and the marker coordinate system.

FIG. 2 illustrates an example of an AR object E in the camera coordinate system and the marker coordinate system. The AR object E illustrated in FIG. 2 is an object having a speech-bubble shape, and contains text data "Crack!" in a speech bubble. A black circle at the tip of the speech bubble of the AR object E indicates a reference point for the AR object E. The coordinates in the marker coordinate system of the AR object E are assumed to be V2m (X2m, Y2m, Z2m). Additionally, the orientation of the AR object E is defined by rotational coordinates G2m (P2m, Q2m, R2m), and the size of the AR object E is defined by magnifications D (Jx, Jy, Jz).

The coordinates of each point constituting the AR object E are coordinates obtained by adjusting the coordinates of each point defined in definition data (AR template), which is a model for the AR object E, based on the coordinates V2m of the reference point, the rotational coordinates G2m, and the magnifications D. Note that, in the AR template, the coordinates of each point are defined on the assumption that the coordinates of the reference point are (0, 0, 0).

Thereafter, upon setting of the reference point V2m of the AR object employing the AR template, the coordinates of each point constituting the AR template are translated based on the coordinates V2m. Additionally, each of coordinates included in the AR template is rotated based on the set rotational coordinates G2m, and is expanded and contracted by the magnifications D. That is, the AR object E of FIG. 2 indicates a state where the AR object E is constructed based on points obtained by adjusting each of the points defined in the AR template based on the coordinates V2m of the reference point, the rotational coordinates G2m, and the magnifications D.

The coordinates of each point of the AR object E, for which coordinates in the marker coordinate system have been set, are transformed to those in the camera coordinate system, and further the position in a screen is calculated based on the coordinates of the camera coordinate system, so that a figure for displaying the AR object E in such a manner as to be overlaid is generated.

The coordinates in the camera coordinate system of each point included in the AR object E are calculated by coordinate transformation (model-view transformation) of the coordinates in the marker coordinate system of that point based on the coordinates Vic in the camera coordinate system of the origin Om of the marker and the rotational coordinates G1c in the marker coordinate system relative to the camera coordinate system. For example, a model-view transformation is performed on the reference point V2m of the AR object E, thereby determining which point V2c (X2c, Y2c, Z2c) in the camera coordinate system the reference point defined in the marker coordinate system corresponds to.

FIG. 3 depicts a transformation matrix M from the marker coordinate system to the camera coordinate system, and a rotation matrix R in the transformation matrix M. The transformation matrix M is a 4×4 matrix. From the product of the transformation matrix M and the column vector (Xm, Ym, Zm, 1) for the coordinates Vm in the marker coordinate system, a column vector (Xc, Yc, Zc, 1) for the corresponding coordinates Vc in the camera coordinate system is obtained.

That is, point coordinates in the marker coordinate system to be coordinate transformed (model-view transformation) are substituted for the column vector (Xm, Ym, Zm, 1) and then a matrix operation is performed, so that the column vector (Xc, Yc, Zc, 1) including the point coordinates in the camera coordinate system is obtained.

A submatrix (rotation matrix R) with first to third rows and first to third columns of the transformation matrix M acts on the coordinates in the marker coordinate system, so that a rotation operation for causing the orientation of the marker coordinate system to coincide with the orientation of the camera coordinate system is performed. A submatrix with the first to third rows and a fourth column of the transformation matrix M acts, so that a translation operation for causing the position of the marker coordinate system to coincide with the position of the camera coordinate system is performed.

FIG. 4 depicts rotation matrices R1, R2, and R3. Note that the rotation matrix R depicted in FIG. 3 is calculated by the product (R1·R2·R3) of the rotation matrices R1, R2, and R3. Additionally, the rotation matrix R1 represents the rotation of an Xm axis relative to the Xc axis. The rotation matrix R2 represents the rotation of the Ym axis relative to the Yc axis. The rotation matrix R3 represents the rotation of the Zm axis relative to the Zc axis.

The rotation matrices R1, R2, and R3 are generated based on the figure of a reference object in a captured image. That is, the angles of rotation P1c, Q1c, and R1c are calculated based on what figure the reference object having a known shape is captured as, in a captured image to be processed, as described earlier. Based on the calculated angles of rotation P1c, Q1c, and R1c, the rotation matrices R1, R2, and R3 are generated, respectively.

The coordinates (Xm, Ym, Zm) in the marker coordinate system of each point constituting the AR object E are transformed into the coordinates (Xc, Yc, Zc) in the camera coordinate system by the model-view transformation based on the transformation matrix M. For example, the coordinates V2m are transformed into coordinates V2c by the model-view transformation. The coordinates (Xc, Yc, Zc) obtained by the model-view transformation represent relative positions from a camera if the camera were to exist in a virtual space where the AR object E exists.

Next, the coordinates in the camera coordinate system of each point of the AR object E are transformed into those in screen coordinate system. The screen coordinate system is in two dimensions (Xs, Ys). The screen coordinate system (Xs, Ys) has, for example, the center of a captured image obtained by image-capturing processing of a camera as the origin (origin Os). Based on the coordinates in the screen coordinate system of each point obtained by this coordinate transformation (perspective transformation), a figure for displaying the AR object E in such a manner as to be overlaid on a captured image is generated.

Coordinate transformation (perspective transformation) from the camera coordinate system to the screen coordinate system is performed, for example, based on a focal distance f of the camera. The Xs coordinate in the coordinates of the screen coordinate system corresponding to the coordinates (Xc, Yc, Zc) in the camera coordinate system is determined by Formula 1 given below. The Ys coordinate in the coordinates of the screen coordinate system corresponding to the coordinates (Xc, Yc, Zc) in the camera coordinate system is determined by Formula 2 given below. $Xs=f \cdot Xc/Zc$ (Formula 1) $Ys=f \cdot Yc/Zc$ (Formula 2)

The figure of the AR object E is generated based on the coordinates (screen coordinate system) obtained by perspective-transforming the coordinates (camera coordinate system) of each point constituting the AR object E. The AR object E is generated by mapping textures onto faces acquired by interpolating a plurality of points constituting the AR object E. In the AR template from which the AR object E originates, it is defined which point is to be interpolated to form a face and which texture is to be mapped to which face.

Through the model-view transformation and perspective transformation described above, the coordinates on the captured image corresponding to the coordinates in the marker coordinate system are calculated, and the figure of the AR object E in accordance with the viewpoint of the camera is generated by utilizing the calculated coordinates. Note that the generated image of the AR object E is called a projection image of the AR object E. The projection image of the AR object E is combined into the captured image, so that visual information offered to the user is augmented.

Additionally, in another manner, a projection image of the AR object E is displayed on a transmissive display. Also in this manner, a figure in the real space that the user obtains through the display coincides with the projection image of the AR object E, and thus visual information offered to the user is augmented.

In the embodiments, the position and orientation of the AR object E to which the AR technology described above is to be applied are designated by the information processing device 1 having a camera function and a display function. The information processing device 1 designates the position and orientation of the AR object E in accordance with the user's input.

Figure 5:
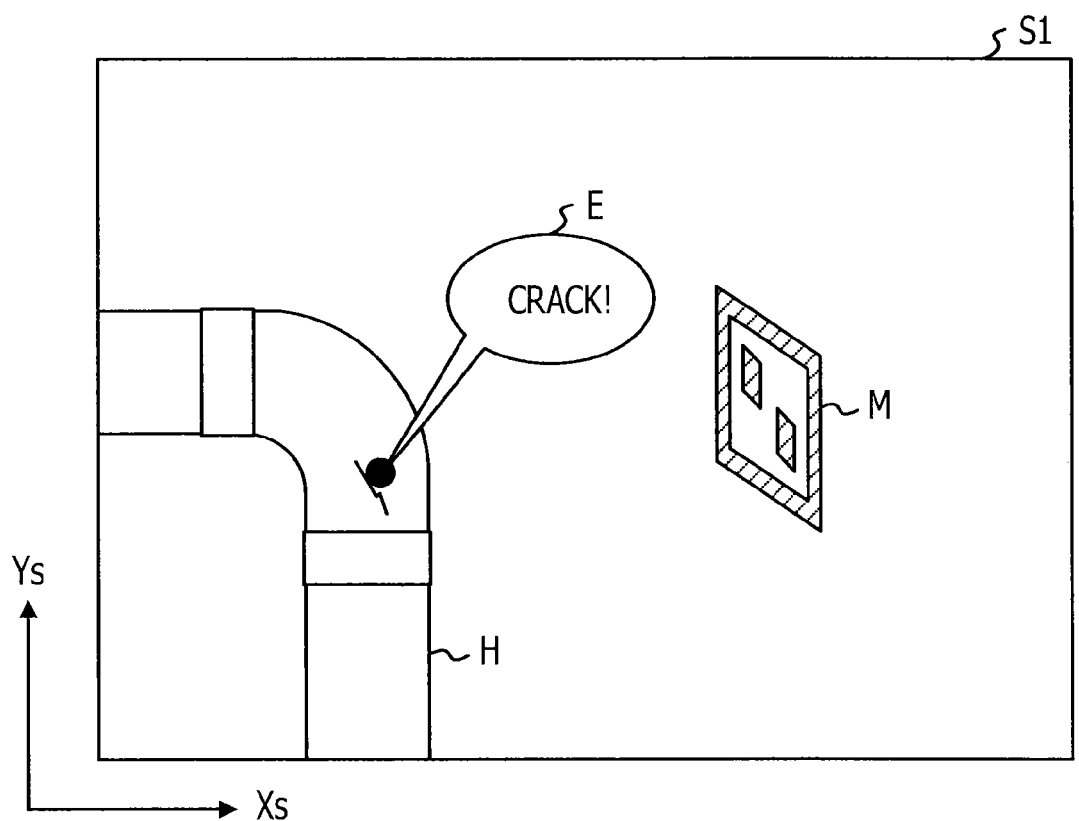
FIG. 5 illustrates an example of a combined image.

FIG. 5 illustrates an example of a combined image. A combined image S1 of FIG. 5 is an example of a combined image in which a projection image of the AR object E is combined with a captured image containing a figure of the marker M and a figure of an object H. The captured image is, for example, an image acquired using a camera function of the information processing device 1 described later, and catches the figure of an object existing in the real space. Note that the camera function of the information processing device 1 captures images at regular frame intervals even if image capturing is not instructed by the user.

The captured image is an image taken in a factory, and the object H that appears in the captured image is a curved pipe. Cracking has occurred in a curved portion of the object H. In maintenance inspection operations in a factory, and so on, if cracking or the like has occurred, an indication of the crack location is recorded as a message to a subsequent inspector.

Recording of the message to a subsequent inspector is performed by setting an AR object having a shape of a speech bubble containing a message "Crack!" at a position that coincides with the crack location. Note that an operation of arranging the AR object having a speech-bubble shape at a position that coincides with the crack location is an exemplary operation of creating AR content.

The user who visits the actual spot later can recognize a crack location by seeing the combined image in which the projection image of the AR object E set by the previous operator is generated on the captured image containing the marker M and the figure of the object H in the way illustrated in FIG. 1 to FIG. 4.

If data on the AR content containing the AR object E is created, the data is uploaded to a management device, for example. Then, the information processing device 1 operated by the user who visits the actual spot later acquires the data from the management device, before heading for the actual spot or at the actual spot, by downloading the data from the management device. Note that the data on the AR content is referred to as AR content information. Details of this will be described later. Additionally, an information processing device that creates AR content and an information processing device operated by the user who visits the actual spot later may be the same, or may be different devices.

Then, the information processing device 1 determines position coordinates $V1c$ and the rotational coordinates $G1c$ of the marker M relative to the camera, based on the figure (shape and size) of the marker M contained in the captured image. Additionally, based on the pattern of the marker M, information such as identification information (marker ID) of the marker is read by the information processing device 1. In the case where a feature of an image is used as a reference object, the information processing device 1 associates the information on the feature with the marker ID in advance and the marker ID is acquired based on the association relationship, for example. Regarding the marker M in this embodiment, the position and orientation in the real space are fixed.

The coordinates (camera coordinate system) of the AR object E are obtained by performing a model-view transformation of coordinates (marker coordinate system) of each point set in the AR object E, based on the position coordinates $V1c$ and the rotational coordinates $G1c$. The information processing device 1 generates a projection image of the AR object E based on the coordinates of a screen coordinate system obtained by perspective transforming the coordinates (the camera coordinate system) of each point of the AR object. The coordinate transformation is as described above.

Through the coordinate transformation described above, the information processing device 1 generates a figure (projection image) of the AR object in a virtual situation in which the AR object E is viewed from the viewpoint of the camera of the information processing device 1. Furthermore, the information processing device 1 combines the generated projection image with the captured image, and thereby is able to make the AR object appear as though the AR object exists in the real space.

As is described above, the combined image S1 generated using the AR technology is used for expansion of information collected through human perception. In the combined image S1 exemplified in FIG. 5, the AR object E with a speech bubble stating "Crack!" is added to a crack location of a pipe, and thereby the information is added to the object existing in the real space.

Here as described earlier, AR content has to be created in advance in order to generate the combined image S1. However, if the arrangement position of the AR object is not correctly designated in creation of AR content, a projection image of the AR object may be displayed at a position that does not coincide with the target of addition of information, depending on the position of the information processing device 1. Accordingly, the purpose of adding of information to an object existing in the real space is not achieved.

For example, if the AR object E is arranged at a position different from that of a crack, there is a possibility that the user who receives a message to a subsequent inspector through the AR object E will be unable to discover the crack. Furthermore, if the position of the AR object E is designated as the position of an object different from the object that is the target of addition of information, wrong information will be provided.

If the AR object E is arranged at another pipe position, an unnecessary operation of checking for a crack at a location where there is no crack will be performed when a message to a subsequent inspector through the AR object E is received. For this reason, it is desired that the position of the AR object E be set to be in accordance with the real space to the extent that allows the user who receives the message for a subsequent inspector through the AR object E to grasp the association relationship between the AR object E and an object (for example, a crack location) in the real space.

Here, creation of AR content is described. Note that, in creation of AR content, an AR object is generated and the position of the AR object (for example, position coordinates of the reference point) in the marker coordinate system is designated. For example, an AR object is generated in such a way that the user selects a desired template from AR templates created in advance.

In contrast, regarding the position designation, it is, for example, conceivable that the user may designate a position in a displayed, captured image. That is, the user who performs position designation may designate a position in the captured image at which the user wishes to display a projection image of the AR object E.

Using this designation method, the user may estimate which position of the captured image a projection image of the AR object E will be combined at, and designate the arrangement position of the AR object. For this reason, the user performs position designation while confirming a screen on which a captured image is displayed, and thereby a projection image of the AR object E is arranged at a position where the projection image coincides with a crack location of the object H. In turn, the information processing device 1 possessed by the user who receives a message for a subsequent inspector may generate the combined image S1 in which the AR object E is displayed in such a manner as to be overlaid at a position that coincides with a crack location.

Figure 6:
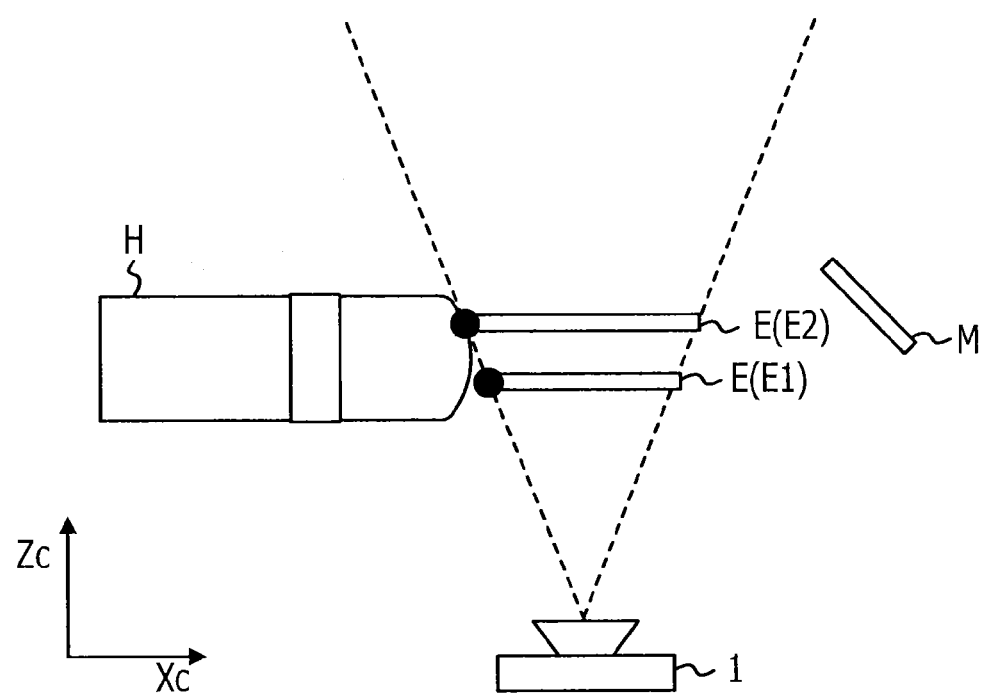
FIG. 6 illustrates a positional relationship between examples of arrangement of the AR object E and an information processing device.

Problems in the designation method mentioned above are described here. FIG. 6 illustrates a positional relationship between examples of arrangement of the AR object E and the information processing device 1. The examples of arrangement exemplified in FIG. 6 indicate the relationships in terms of position in a state where a bird's eye view of the marker M, the object H, and the AR object E illustrated in FIG. 5 is taken. However, the AR object E does not exist in the real space and therefore is a figure arranged virtually.

Furthermore, the examples of arrangement illustrated in FIG. 6 also illustrate the information processing device 1 including an imaging device that captures the marker M and the object H. Note that FIG. 6 is an illustration in which the information processing device 1, the marker M, the object H, and the AR object E are projected on the two-dimensional space of the Xc axis and the Zc axis of the camera coordinate system.

FIG. 6 illustrates examples of two ways as arrangement of the AR object E exemplified in FIG. 5. The AR object E (E1) when arranged near the information processing device 1 is illustrated in FIG. 6. The AR object E (E2) when arranged at a distance, as another example, is also illustrated.

That is, if the position of the AR object E is set in the combined image S1 exemplified using FIG. 5, it is not determined whether the AR object E is arranged like the case of the AR object E (E1) or like the case of the object E (E2). Both the two examples are recognized as the same AR object E in a combined image using a captured image taken from some position, in the projection image illustrated in FIG. 5.

However, as may be seen from the bird's-eye view, if the AR object E is arranged like the AR object E (E1), the AR object E is set, also in the Zc direction, at a position that coincides with that of a crack of a pipe. On the other hand, if the AR object E is arranged like the AR object E (E2), the AR object E is set at a position that does not coincide with the pipe (substantially distant position).

Figure 7:
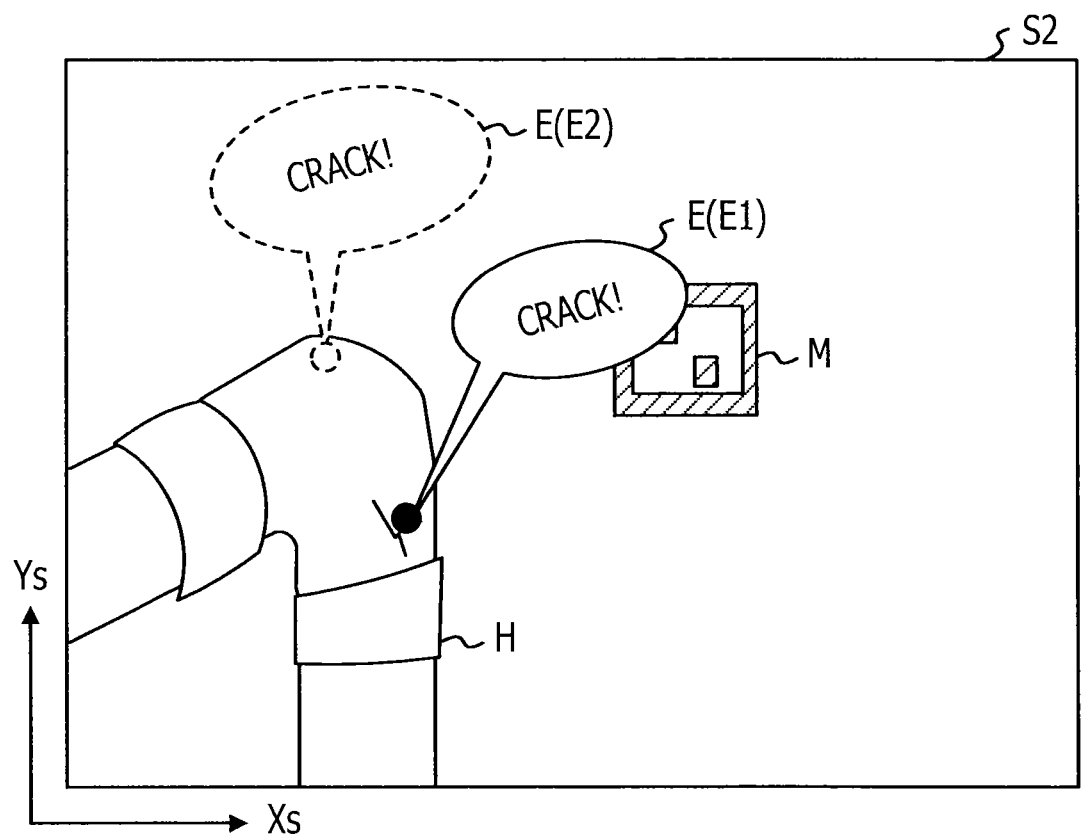
FIG. 7 illustrates an example of another combined image.

FIG. 7 illustrates an example of another combined image. The combined image S2 exemplified in FIG. 7, like the combined image S1, is a screen on which a captured image taken by an imaging device included in the information processing device 1 and a projection image of the AR object E are combined and displayed. However, the position at which the information processing device 1 takes a captured image differs from that in the example of FIG. 5 and FIG. 6. For example, there is a possibility that the user who visits the actual spot after setting of the AR object E will confirm the AR object E at an angle of view like as used for the combined image S2.

The figures of the AR object E (E1) and the AR object E (E2) in the combined image S2 are projection images corresponding to the AR object E (E1) and the AR object E (E2) exemplified in FIG. 6. Note that any AR object has to be displayed in the actual combined image; however, as described with reference to FIG. 6, if the position in the Zc direction is not designated, there is a possibility that a plurality of AR objects will be displayed at different positions as in FIG. 7.

Figure 8:
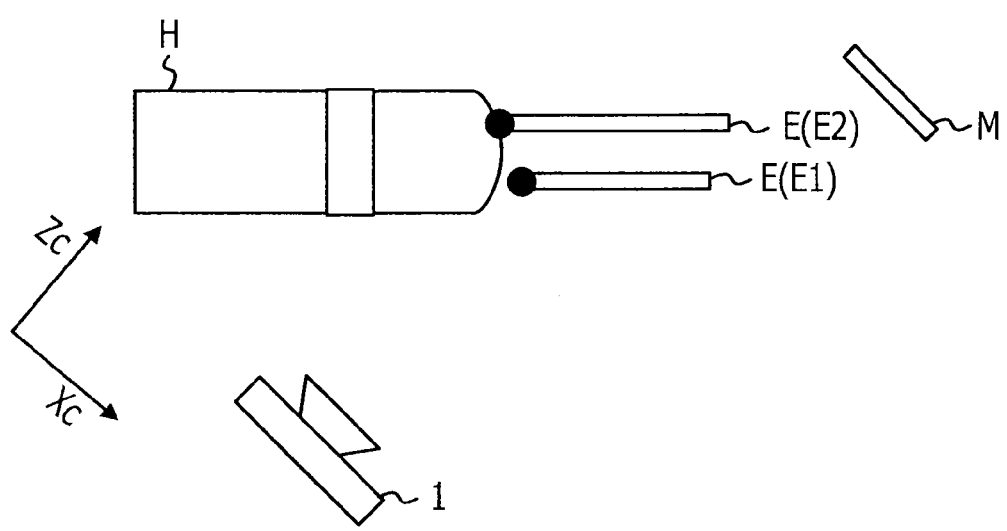
FIG. 8 illustrates another positional relationship between examples of arrangement of the AR object E and the information processing device.

FIG. 8 illustrates another positional relationship between examples of arrangement of the AR object E and the information processing device. FIG. 8, like FIG. 6, illustrates the relationships in terms of position in a state where a bird's eye view of the information processing device 1, the marker M, the object H, and the AR object E illustrated in FIG. 5 is taken. The captured image of the combined image S2 exemplified in FIG. 7 is a captured image taken by the information processing device 1 arranged at the position illustrated in FIG. 8.

If the position of the AR object E is the position of the AR object E (E1) in FIG. 6, a projection image of the AR object E is displayed at a position that coincides with that of the object H, as in the case of the AR object E (E1) of the combined image S2 illustrated in FIG. 7.

On the other hand, if the position of the AR object E is the position of the AR object E (E2) in FIG. 8, a projection image of the AR object E is displayed at a position that is different from that of the object H, as in the case of the AR object E (E2) of the combined image S2 illustrated in FIG. 7.

If a display is performed as in the case of the AR object E (E2), a crack does not exist at a position where information "Crack!" is added, and therefore the purpose of adding of information is not achieved. Additionally, such a display may mislead the user into believing that there is a crack at a position indicated by the AR object E (E2). That is, the AR object E is set at the position of E2, and thereby a leakage of information that has to be offered occurs and unnecessary information is offered.

In this way, in the operations of creating AR content, even if the position at which the AR object E is designated for a captured image (for example, an image obtained by excluding the AR object E from the combined image S1 of FIG. 5), the combined image S2 as illustrated in FIG. 7 will be created unless the arrangement position in the Zc direction is designated appropriately. That is, it is impossible to designate an appropriate arrangement position of the AR object (for example, the coordinates V2m of the reference point of the AR object).

Here, in order to uniquely define the arrangement position of the AR object, the following has been performed. Note that the method described below is a method for uniquely defining the arrangement position of the AR object, and does not necessarily determine the arrangement of the AR object at an appropriate position.

For example, in a conventional position designation method, the origin coordinates (X1c, Y1c, Z1c) of the marker in the camera coordinate system are acquired. Then, the position V2m (Xm, Ym, Zm) of the AR object has been determined utilizing the original coordinates "Z1c" of the marker and the position (Xs, Ys) designated in the captured image.

In the conventional position designation method, at the position of the AR object E (E2) having the same position in the depth direction (Zc direction) as the marker, of the AR object E (E1) and the AR object E (E2) illustrated in FIG. 6, the AR object is arranged to be virtually arranged. Accordingly, in the combined image S2 of FIG. 7, a projection image of the AR object E (E2) is displayed on the combined image, and thus it has been difficult for the user who views the combined image to acquire appropriate information.

As described above, even if the position of a projection image of the AR object E is designated while the figure of the object H displayed on a captured image is confirmed, the position in the Zc direction of the AR object E is not appropriately designated. For this reason, a situation occurs where, in the combined image S2 taken from another angle, a projection image of the AR object is displayed at a position that does not coincide with the crack location in the object H.

Note that the AR technology is available for instructions given for content of operations performed by the operator, in addition to the operation of issuing a message to a subsequent inspector. For example, the user who creates AR content creates AR content that provides an instruction for an operation of checking to see that a valve (not illustrated) provided to the pipe is closed. On that occasion, the AR object E' (not illustrated) having a speech-bubble shape containing a message "Check to see that valve is closed" has to be arranged at a position that coincides with the position of the valve.

After the AR content is created, the user who performs a checking operation takes an image of a reference object arranged near the pipe by using an information processing device, and thereby is allowed to view a combined image on which the AR object E is displayed in such a manner as to be overlaid. Then, the user can recognize that it is desired to check to see that the valve is closed. However, as in the example of a message to a subsequent inspector, if the AR object E' is displayed at a position that does not coincide with the position of the valve, it is impossible for the user to perform the checking operation accurately or smoothly.

In the techniques disclosed in this embodiment, at the time of creating AR content, first, the user performs an image-capturing operation at a position where the user wishes to arrange the AR object. Note that, the image-capturing operation as used herein is depressing a shutter button, and differs from an operation in which an imaging device takes an image at an interval of predetermined number of frames.

Then, the information processing device 1 according to this embodiment acquires a captured image as an input image, and, based on a figure of a reference object recognized from the input image, calculates position information indicating an image-capturing position with respect to the reference object. Then, the information processing device 1 sets the position information as an arrangement position of the AR object.

For example, the user captures an image of the marker M from the position at which a crack of the pipe H exists. Then, the information processing device 1, which has acquired the captured image as an input image, calculates the coordinates of the image-capturing position in the marker coordinate system. Then, the coordinates are set as coordinates V2$m$ of the reference point of the AR object.

Figure 9:
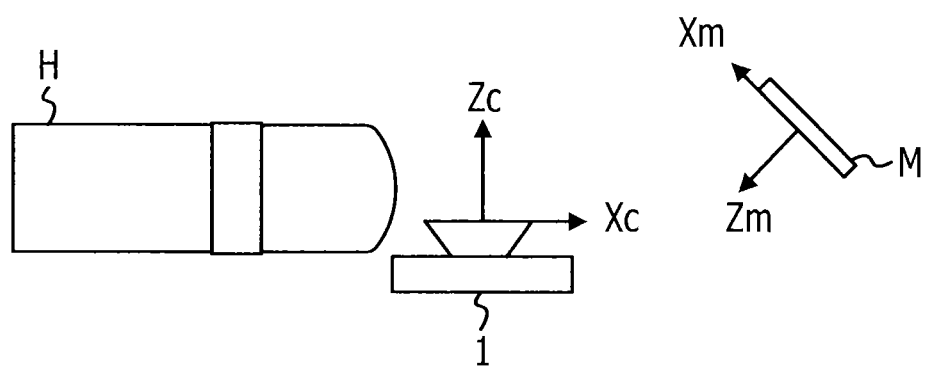
FIG. 9 is an illustration for explaining arrangement of the AR object in this embodiment.

FIG. 9 is an illustration for explaining arrangement of the AR object in this embodiment. The imaging device included in the information processing device 1 captures an image near a crack location of the pipe H. Note that it is preferable that, not only in terms of Xc and Zc but also in terms of the height Yc, the imaging device be close to the position of a crack. Additionally, the imaging device takes a picture at a position and an angle of view at which the marker M can be captured.

Then, the information processing device 1 calculates the position information (Xm, Ym, Zm) indicating the coordinates of the information processing device 1 in the marker coordinate system. That is, the coordinates in the marker coordinate system to which the origin of the camera coordinate system corresponds are determined. Details of this will be described later. Then, the position information is set as the arrangement position of the AR object.

For example, the AR object is virtually arranged at the position of the information processing device 1 in FIG. 9. Accordingly, the information processing device 1, which later captures an image of the marker M similar to the previous one, will generate a combined image in such a manner that a virtual space in which the AR object is arranged at the position of the information processing device 1 in FIG. 9 is captured as an image. Note that even if the position of the information processing device 1 that later captures an image of the marker M similar to the previous one is any position, a projection image of the AR object will be displayed at an appropriate position in the combined image.

As is described above, the user who creates AR content may designate the arrangement position of the AR object only by performing an image-capturing operation. That is, operations of creating AR content may be simplified. Note that the image-capturing operation is performed at a position near the target position related to content indicated by the AR content.

[First Embodiment]

Figure 10:
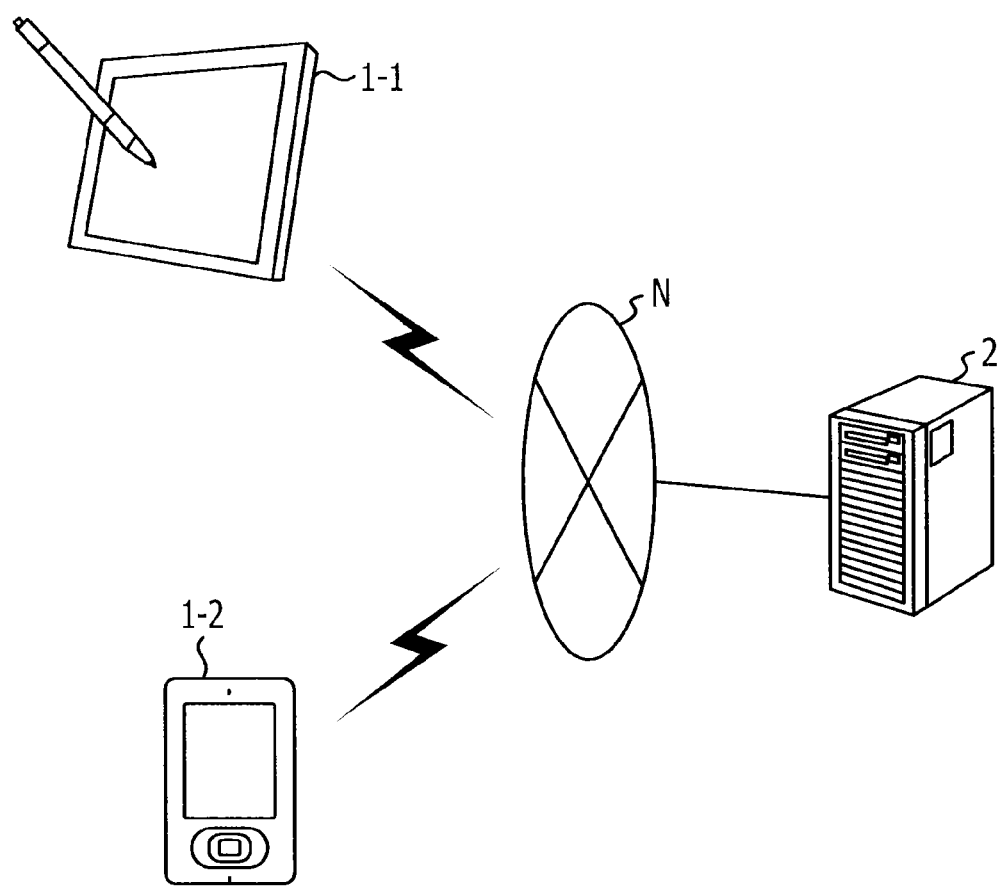
FIG. 10 is a system configuration illustration.

First, detailed processing according to a first embodiment and configurations of an information processing device and so on will be described. FIG. 10 is a system configuration illustration. In the example of FIG. 10, a communication terminal 1-1 and a communication terminal 1-2 are illustrated as examples of an information processing device. Hereinafter, these are generically referred to as the information processing device 1. Additionally, the information processing device 1 communicates over a network N with a management device 2.

The information processing device 1 is, for example, a computer, such as a tablet personal computer (PC) or a smartphone, having an imaging device. The management device 2 is, for example, a server computer and manages the information processing device 1. The network N is the Internet, for example. Note that a system according to this embodiment includes the information processing device 1 and the management device 2.

The information processing device 1 creates AR content. Specifically, the information processing device 1 creates an AR object and determines an arrangement position of the AR object in the marker coordinate system. Then, the information processing device 1 generates AR content information on the created AR content. Additionally, the information processing device 1 may generate a combined image utilizing the created AR content information.

In contrast, the management device 2 manages information on the AR content created by the information processing device 1. For example, if creation of AR content is completed, the information processing device 1 sends AR content information on the created AR content to the management device 2. Upon receipt of the AR content information, the management device 2 stores the AR content information in a storage unit of the management device 2.

Additionally, in the case where the information processing device 1 generates a combined image utilizing AR content information, the management device 2 receives a request for the AR content information from the information processing device 1. The management device 2 sends the AR content information to the information processing device 1 in response to the request. Note that, as described later, in AR displaying, template information that defines templates of the AR object, in addition to AR content information, is also used. Accordingly, the management device 2 sends template information, together with the AR content information, to the information processing device 1.

The AR content information, details of which will be described later, is information for defining AR content. In this embodiment, AR content information is created by the information processing device 1. Template information is information for drawing model data of AR content. Additionally, AR content information is exemplary setting information.

Figure 11:
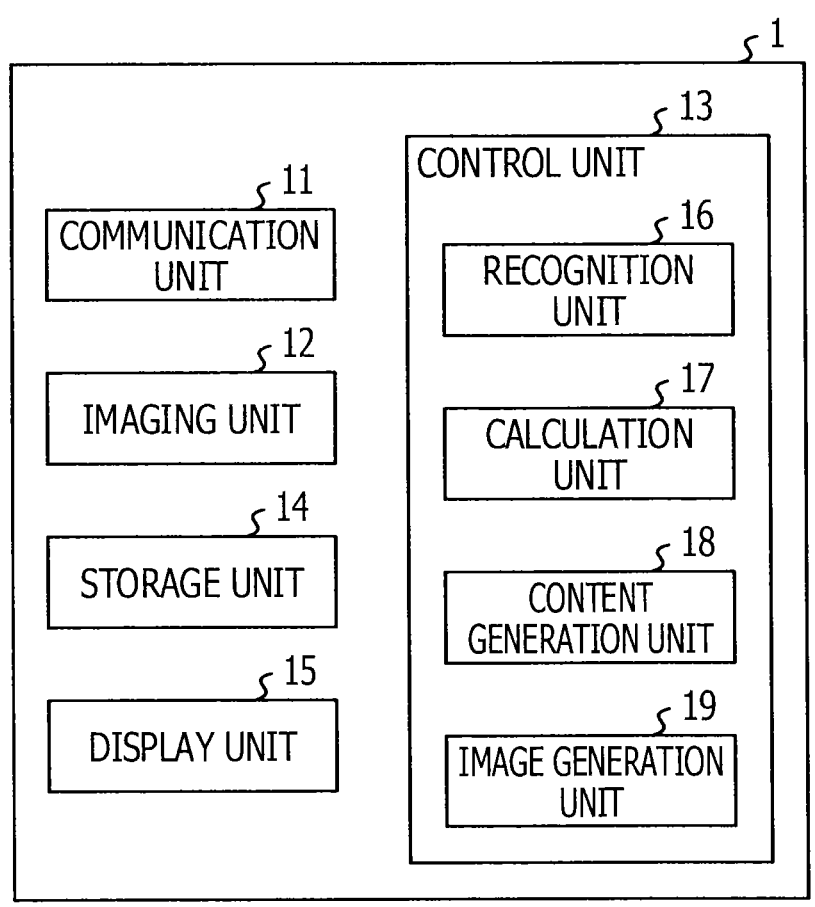
FIG. 11 is a functional block diagram of the information processing device.

Next, the functional configuration of the information processing device 1 will be described. FIG. 11 is a functional block diagram of the information processing device 1. The information processing device 1 includes a communication unit 11, an imaging unit 12, a control unit 13, a storage unit 14, and a display unit 15. Additionally, if the information processing device 1 does not include the imaging unit 12, a captured image may be acquired from another imaging device by way of communication. In this case, a position at which an image is captured by another imaging device is utilized for creation of AR content.

The communication unit 11 communicates with other computers. For example, the communication unit 11 sends generated AR content information to the management device 2. Additionally, in order to generate a combined image, AR content information and template information are received from the management device 2.

The imaging unit 12 captures an image. Then, the imaging unit 12 inputs the captured image to the control unit 13.

The control unit 13 controls various kinds of processing performed by the information processing device 1. For example, the control unit 13 accepts a capture image taken by the imaging unit 12 as an input image, and calculates position information on an image-capturing position with respect to the marker. Furthermore, the control unit 13 generates AR content information. Note that the control unit 13 includes a recognition unit 16, a calculation unit 17, a content generation unit 18, and an image generation unit 19.

The recognition unit 16 recognizes a reference object from an input image. In this embodiment, the recognition unit 16 recognizes a marker M. A conventional object recognition method is applied to a method for recognizing the marker M. For example, the recognition unit 16 uses a template that predetermines the shape of the marker M, and performs template matching, thereby recognizing the marker M.

Furthermore, upon recognizing that the reference object is included in the imaging device, the recognition unit 16 acquires identification information for identifying the reference object. For example, the marker ID is acquired. Note that the marker ID is identification information for identifying a marker. Additionally, a conventional acquisition method is applied to a method for acquiring the marker ID. For example, in the case where the reference object is a marker, a unique marker ID is acquired from an arrangement of black and white, likewise in the case of a two-dimensional bar code.

Additionally, if the recognition unit 16 recognizes the reference object, the recognition unit 16 calculates the position and rotational coordinates of the reference object based on the figure of the reference object. Note that the position and rotational coordinates of the reference object are the values in the camera coordinate system. Furthermore, the recognition unit 16 generates the transformation matrix M based on the position and rotational coordinates of the reference object.

Next, based on the figure of the reference object recognized by the recognition unit 16, the calculation unit 17 calculates the position information indicating an image-capturing position of the input image with respect to the reference object. Note that, here, the transformation matrix M generated by the recognition unit 16 is utilized. For example, the calculation unit 17 calculates the coordinate position of the marker coordinate system, based on the shape of the figure of the marker in the input image.

Here, a method for calculating position information is described with reference to FIG. 1, FIG. 3, and FIG. 4. First, the recognition unit 16 generates the transformation matrix M. Note that the method for generating the transformation matrix M is as mentioned earlier. After the transformation matrix M is generated by the recognition unit 16, the calculation unit 17 determines a column vector Am (Xm, Ym, Zm, 1) by the product of an inverse $M^{-1}$ of the transformation matrix M from the marker coordinate system to the camera coordinate system and a column vector Ac (Xc, Yc, Zc, 1). Specifically, the calculation unit 17 determines the column vector Am (Xm, Ym, Zm, 1) from Formula 3 given below.

$$Am = M^{-1} \cdot Ac \quad \text{(Formula 3)}$$

Note that, assuming that the image-capturing position approximately coincides with the origin of the camera coordinate system, the image-capturing position is (0, 0, 0). Accordingly, by substituting a column vector (0, 0, 0, 1) for Ac, it can be determined from Formula 3 which point of the marker coordinate system the origin of the camera coordinate system corresponds to.

Hereinafter, it is assumed that the point of the marker coordinate system corresponding to the origin of the camera coordinate system is U (Xu, Yu, Zu). Note that the point U is a point composed of values in three dimensions of a column vector Au (Xu, Yu, Zu, 1) determined by Formula 3. That is, the calculation unit 17 calculates U (Xu, Yu, Zu) as position information.

Description is now returned to FIG. 11. The content generation unit 18 generates AR content information. That is, the content generation unit 18 associates position information with display data on the AR object, and generates AR content information. Note that display data includes, for example, information designating a template to be applied, attached information displayed as text information within the template, and the like. Details of this will be described later.

The image generation unit 19 generates a combined image based on the AR content information generated by processing of creating AR content and template information. Note that, the transformation matrix M generated by the recognition unit 16 is utilized for generating a combined image.

Additionally, the image generation unit 19 generates various images other than a combined image. For example, an image for template selection in which a list of templates prepared in advance is displayed. Note that the image for template selection will be described later. The image generation unit 19 displays a generated image by controlling the display unit 15.

The storage unit 14 stores various kinds of information under control of the control unit 13. The storage unit 14 stores AR content information generated at the time of creation of AR content. Additionally, information such as marker management information is also temporarily stored.

Note that marker management information is information on a marker recognized from an input image. Details of this will be described later.

Furthermore, if, in addition to the AR content information generated at the time of creation of AR content, AR content information generated in the past and template information are acquired from the management device 2, the storage unit 14 stores these pieces of information.

Finally, the display unit 15 displays a combined image generated by the image generation unit 19 and other images.

Next, various kinds of information will be described. FIG. 12, FIG. 13, and FIG. 14 illustrate the data structure of data used for processing of designating the position of the AR object E.

FIG. 12 illustrates a marker management table T1. The marker management table T1 stores marker management information. Note that the marker management information is information on a recognition result obtained from the figure of the marker M contained in an input image. Upon recognition of the marker M, the recognition unit 16 stores marker management information in the marker management table T1.

The marker management table T1 contains information, such as the marker ID, coordinates ($X_c$, $Y_c$, $Z_c$, $P_c$, $Q_c$, $R_c$) in the camera coordinate system, and a content addition flag for each of markers recognized by the recognition unit 16.

According to information stored in the marker management table T1, the marker ID of the marker M in this embodiment is "100", the position coordinates are ($X1_c$, $Y1_c$, $Z1_c$), and the rotational coordinates are ($P1_c$, $Q1_c$, $R1_c$). The content addition flag is information for identifying a marker for which content is to be added. For example, when AR content associated with the marker of a marker ID "100" is created, the content flag corresponding to the marker ID "100" is set to "1".

FIG. 13 illustrates a template information table T2. The template information table T2 stores template information for defining each template applied as model data of the AR object. The template information includes identification information of a template (template ID), coordinate information of each vertex T21 constituting the template, and configuration information (designation of the order of vertices and the texture ID) of each face T22 constituting the template.

The order of vertices indicates the order of vertices constituting a face. The texture ID indicates the identification information of a texture mapped to the face. The reference point of a template is, for example, the 0th vertex. Using the information indicated in the template information table T2, the shape and pattern of a three-dimensional model are defined.

FIG. 14 illustrates an AR content information table T3. The AR content information table T3 stores AR content information on AR content. In the AR content information table T3, the content ID of AR content, the position coordinates ($X_m$, $Y_m$, $Z_m$) in the marker coordinate system and the rotational coordinates ($P_m$, $Q_m$, $R_m$) in the marker coordinate system of the reference point, the magnifications D ($J_x$, $J_y$, $J_z$) with respect to an AR template, the template ID of the AR template, the marker ID, and additional information are stored.

The position coordinates stored in the AR content information table T3 are coordinates in the marker coordinate system with respect to a marker identified by the marker ID stored in the same record as the position coordinates. The calculation unit 17 calculates the position coordinates as position information.

Additionally, in this embodiment, it is assumed that the rotational coordinates ($P_m$, $Q_m$, $R_m$) are (0, 0, 0). That is, the AR object of the AR content is defined in three axes parallel to the axes of the marker coordinate system.

When the image generation unit 19 generates a projection image of the AR object E, the AR template illustrated in FIG. 13 is adjusted based on AR content information (position, direction, and size). That is, the position, orientation, and size of the AR object E are designated by setting information managed in the AR contents information table T3. Additionally, additional information is information added to the AR object E. As the additional information, text, access information to a Web page or a file, and so on are used.

For example, AR content whose content ID illustrated in FIG. 14 is "1000" includes vertices obtained in such a way that the coordinates of each vertex defined in an AR template of "10" are multiplied by 1 in the respective $X_m$, $Y_m$, and the $Z_m$ directions, are rotated by rotational coordinates (0, 0, 0), and are translated in accordance with the position coordinates (20, 25, 10). For the AR content, furthermore, additional information is mapped to a face constituting the AR object E.

The content generation unit 18 generates AR content information and stores the AR content information in the AR content information table T3 of the storage unit 14. Note that while the AR content information table T3 stores AR content information on newly generated AR content, it may also store AR content information generated in the past together therewith.

Note that AR content information generated in the past is acquired from the management device 2. For example, even at the time of creation of AR content, a combined image containing AR content information created in the past for a marker with which AR content is considered to be newly associated is provided to the user. Accordingly, under the recognition of arrangement of the AR content generated in the past, the user who creates AR content may designate the arrangement position of the AR object related to the new AR content.

Figure 15:
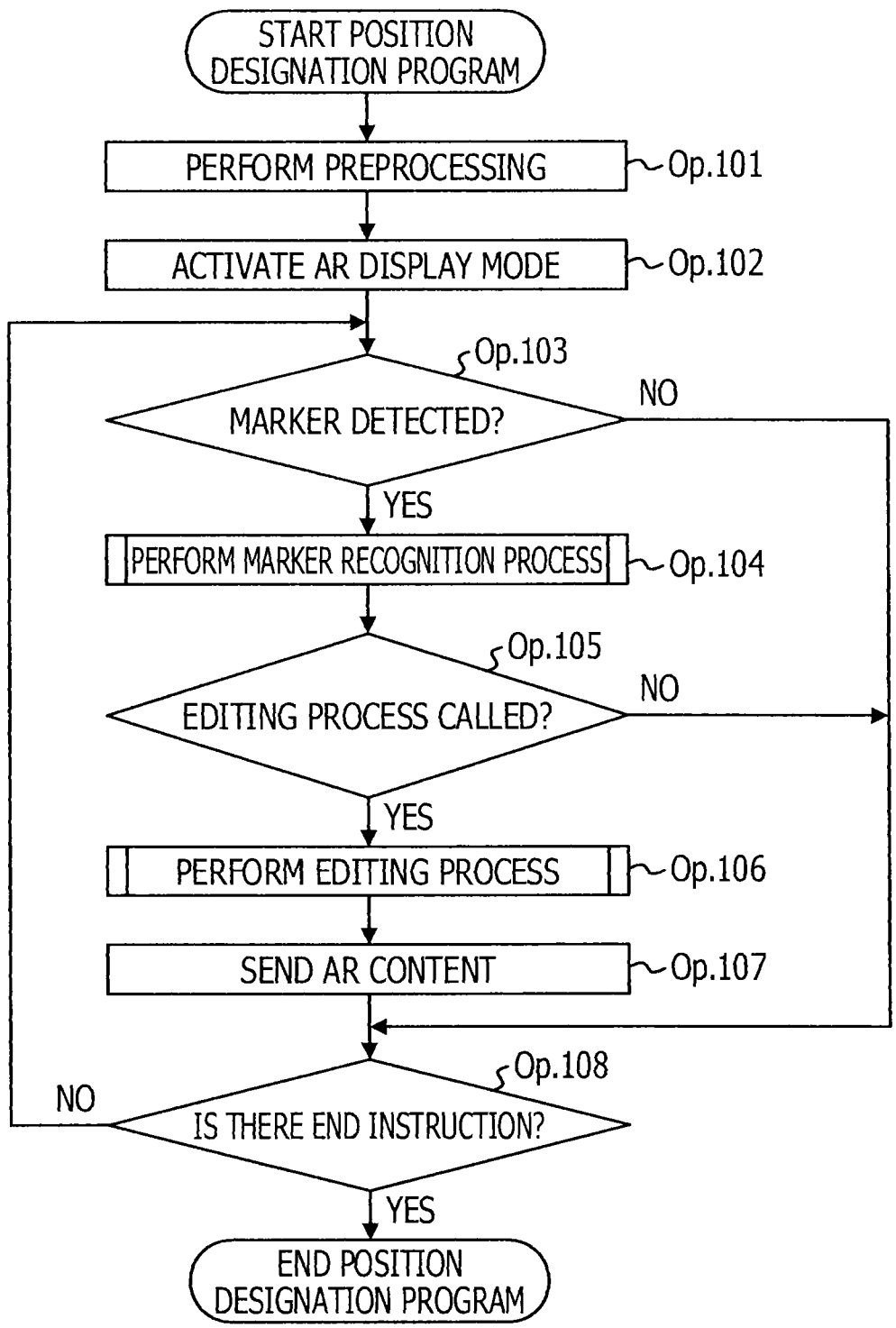
FIG. 15 illustrates an example of a processing procedure of a position designation process.

Next, the flows of the various processes regarding this embodiment will be described. FIG. 15 illustrates an example of a processing procedure of a position designation process. A position designation program in which the position designation process is defined is a program in which the procedure of the position designation process performed by the control unit 13 is defined.

Upon start of the position designation program, the control unit 13 performs preprocessing of position designation (Op. 101). In processing of Op. 101, template information is acquired from the management device 2.

When preprocessing of Op. 101 is performed, the control unit 13 issues an instruction for activation of an AR display mode (Op. 102). In Op. 102, the control unit 13 causes, for example, the imaging unit 12 to start photographing at predetermined time intervals and causes the recognition unit 16 to start marker detection processing for a photographed image. Furthermore, the control unit 13 causes the display unit 15 to display a captured image photographed by the imaging unit 12.

When instructed from the control unit 13 to perform photographing, the imaging unit 12 acquires an image generated by using an image device, at a predetermined time interval, and stores the acquired image in the storage unit 14. The storage unit 14 is provided with a buffer that stores a plurality of images, and images taken by the imaging unit 12 are stored in the buffer. For example, the buffer provided in the storage unit 14 is a display buffer in which images that the display unit 15 displays are stored. Images stored in the display buffer are sequentially displayed on the display unit 15.

The recognition unit 16 acquires an image stored in the buffer provided in the storage unit 14 and determines whether the feature of the marker M is contained in the acquired image (Op. 103). The recognition unit 16 may perform detection processing for one image of a predetermined number of images stored in the buffer.

Additionally, the recognition unit 16 reads the marker ID of the marker M. Reading of the marker ID is performed, for example, based on information on the luminance within a quadrangular frame. For example, for regions obtained by dividing a quadrangular frame, a region where the luminance has a value equal to or more than a predetermined value is set to "1" and a region where the luminance has a value less than the predetermined value is set to "0", and it is determined for each of the regions in a predetermined order whether that region is "1" or "0", and a column of information obtained by the determination is set as the marker ID.

Additionally, for example, under the condition that an arrangement of regions where the luminance has a value equal to or more than the predetermined value and regions where the luminance has a value less than the predetermined value, in a quadrangular frame, is set as a pattern, a marker ID corresponding to the pattern may be used. Furthermore, if the numerical range assigned to a marker ID is determined in advance and the read marker ID is not within the numerical range, it may be determined that the marker ID has not been read.

The recognition unit 16 stores the read marker ID in the marker management table T1 stored in the storage unit 14. Furthermore, the recognition unit 16 notifies the control unit 13 of the position coordinates (screen coordinate system) of the figure of the marker M.

If the recognition unit 16 has detected the marker M (Op. 103: YES), a marker recognition process is performed (S104). If the recognition unit 16 has not detected the marker M (Op. 103: NO), it is determined whether an instruction for completion of the program has been given (Op. 108). If an instruction for completion has not been given (Op. 108: NO), the control unit 13 determines whether the marker has been detected or not (Op. 103).

Figure 16:
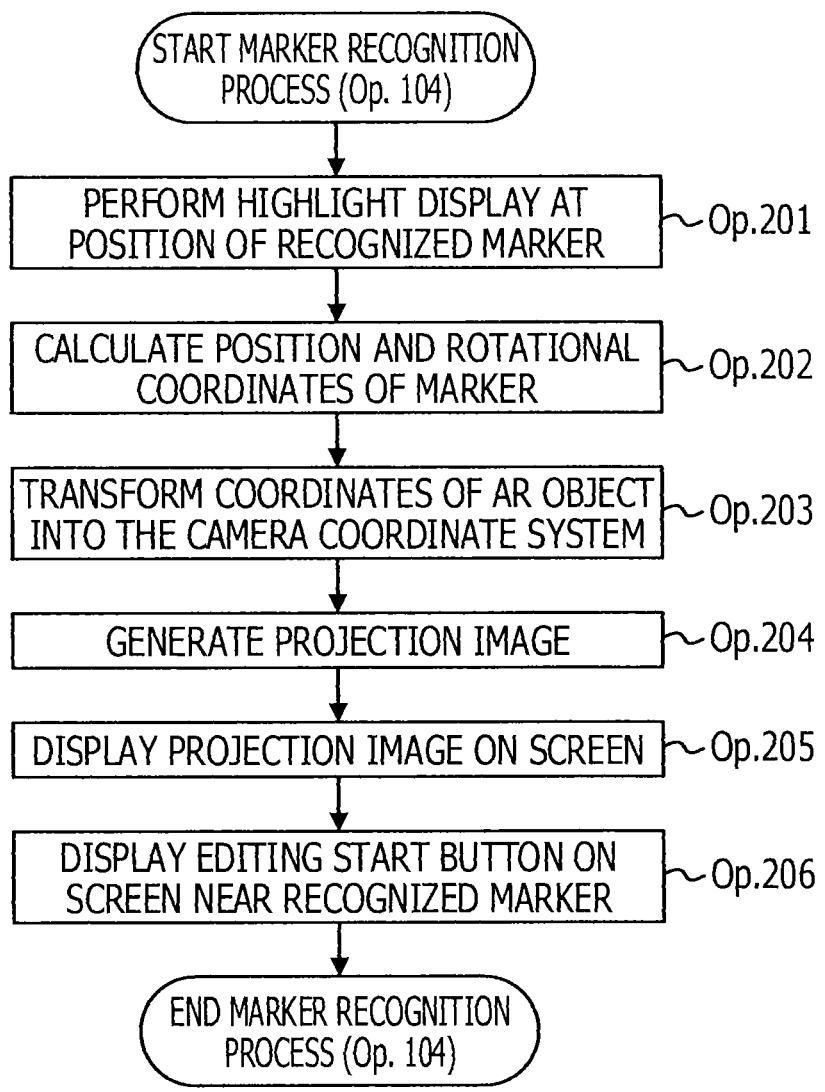
FIG. 16 illustrates an example of a processing procedure of a marker recognition process.

FIG. 16 illustrates an example of a processing procedure of the marker recognition process. Upon start of the marker recognition process, under an instruction from the recognition unit 16, the image generation unit 19 makes a highlight (highlight display) indicating the existence of a marker at a position where the recognized marker M is displayed within a display screen of the display unit 14 (Op. 201). Highlighting is performed, for example, by displaying a quadrangular frame at a position where the marker M is displayed, and plays a role of notifying the user of detection of the marker M.

The recognition unit 16 notifies the image generation unit 19 of the position coordinates (screen coordinate system) of the marker M. The image generation unit 19 combines a highlighting shape at a position in accordance with the notification from the recognition unit 16 with an image displayed in the display unit 15 (an image in the display buffer). The highlighting shape is, for example, a display element such as a square red frame.

When processing of Op. 201 is performed, the recognition unit 16 calculates the position and rotational coordinates of the marker M (Op. 202). That is, information for generating the transformation matrix M is calculated. The recognition unit 16 calculates the position and rotational coordinates (camera coordinate system) of the marker M based on the figure of the marker M detected in Op. 103. The position and rotational coordinates (camera coordinate system) of the marker M are calculated, for example, based on the shape of the figure of the marker M and the position thereof in the image. The calculated position and rotational coordinates (camera coordinate system) are stored in the marker management table T1.

Next, the image generation unit 19 performs processing of displaying AR content associated with a marker registered in the marker management table T1 (Op. 203, Op. 204, Op. 205). Note that processing of displaying AR content is performed if AR content (AR content created in the past) associated with the recognized marker are acquired from the management device 2. If the AR content does not exist, processing of displaying AR content is omitted.

The image generation unit 19 searches for AR content information including the marker ID registered in the marker management table T1 among AR content information registered in the AR content information table T3. If AR content that meets the requirement exists, the image generation unit 19 acquires the AR content information from the AR content information table T3. Then, a template information table corresponding to a template ID included in the acquired AR content information is read.

Then, the image generation unit 19 transforms the coordinates of each point of the AR object defined by the template information from the marker coordinate system to the camera coordinate system (Op. 203). Then, the image generation unit 19 transforms the coordinates of each point of the AR object from the camera coordinate system to the screen coordinate system, thereby generating a projection image of the AR object (Op. 204).

When a projection image is generated for the AR object, the image generation unit 19 combines the projection image with a photographed image in the display buffer (Op. 205). When processing of Op. 205 is performed, the control unit 13 causes the display unit 15 to display an editing start button B10 (Op. 206). When processing of Op. 206 is performed, the control unit 13 completes the marker recognition process illustrated in FIG. 16, and returns to the flowchart of the position designation process illustrated in FIG. 15.

Subsequently, the control unit 13 determines whether input to the editing start button B10 is detected in a predetermined period of time after the editing start button B10 is displayed in Op. 206 (Op. 105). If input to the editing start button is detected (Op. 105: YES), the control unit 13 performs an editing process illustrated in FIG. 18 (Op. 106). If input to the editing start button B10 is not detected in the predetermined period of time (Op. 105: NO), the control unit 13 determines whether the control unit 13 is instructed to complete the program (Op. 108).

Figure 17:
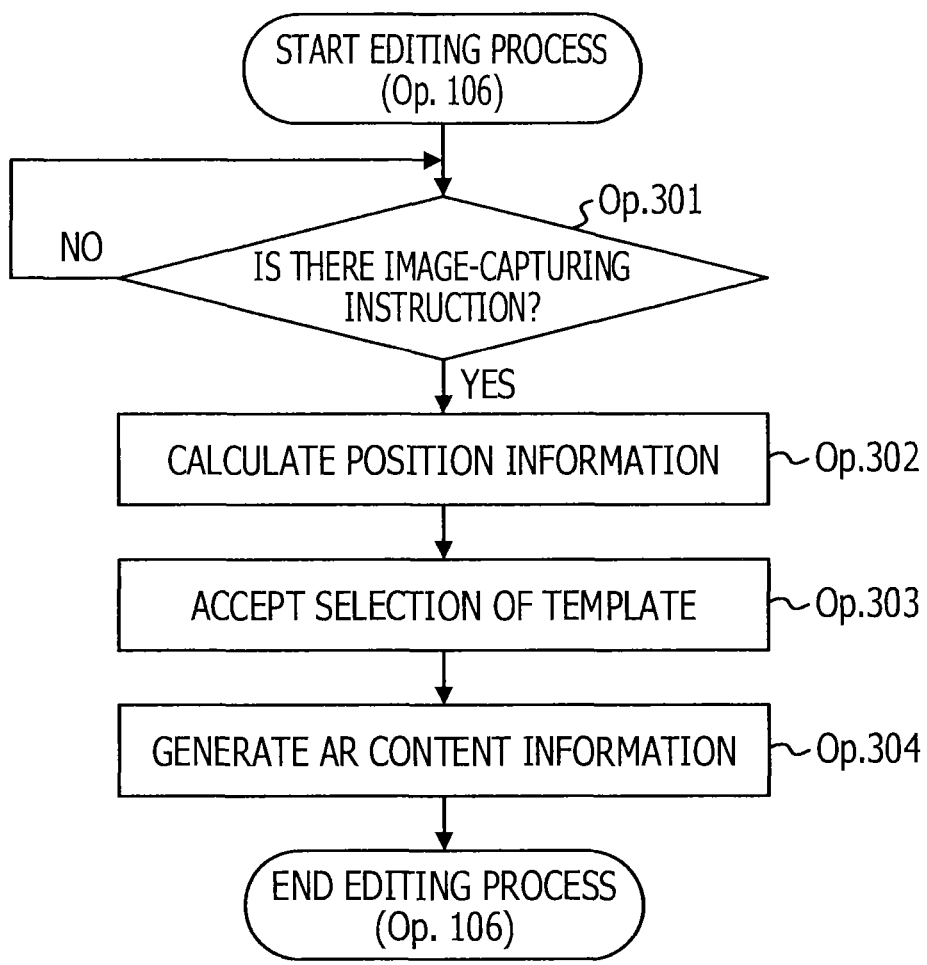
FIG. 17 illustrates an example of a processing procedure of an editing process.

FIG. 17 illustrates an example of a processing procedure of the editing process. Upon start of the editing process, the control unit 13 determines whether an instruction for image capturing from the user has been accepted (Op. 301). Here, for example, it is determined whether a shutter button has been depressed by the user. Note that the imaging unit 12 performs image capturing at an interval of a predetermined number of frames, without accepting an instruction for image capturing from the user. If an instruction for image capturing issued by the user has been accepted, the imaging unit 12 separately captures an image at the timing of the instruction for image capturing.

The control unit 13 waits until an instruction for image capturing is accepted (Op. 301: No). Otherwise, if an instruction for image capturing has been accepted (Op. 301: Yes), the imaging unit 12 captures an image, and the calculation unit 17 acquires the image from the imaging unit 12. Then, the calculation unit 17 assumes that the captured image is an input image, and, based on the figure of a reference object in the input image, calculates position information indicating an image-capturing position with respect to the reference object (Op. 302). Note that the rotational coordinates are set, for example, to (0, 0, 0).

Then, the content generation unit 18 accepts selection of a template (Op. 303). For example, after calculating an image-capturing position, the calculation unit 17 requests the image generation unit 19 to generate a template selection screen. After the display unit 15 displays the template selection screen, the content generation unit 18 acquires the template ID of a template designated on the template selection screen by the user. Note that the template selection screen will be described later. Note that a template could be selected ahead of acquisition of an instruction for image capturing.

Then, the content generation unit 18 generates AR content information including the position information calculated by the calculation unit 17 and the template ID of the designated template (Op. 304). Note that, in Op. 303, for the template employed as the AR object, input of magnification information and additional information may be accepted. In this case, the AR content information includes magnification information and additional information.

When processing of Op. 304 is performed, the control unit 13 completes the editing process illustrated in FIG. 17, and returns to processing of the flowchart of the position designation process illustrated in FIG. 15. Under control of the control unit 13, the communication unit 11 sends generated AR content information to the management device 2 (Op. 107). Note that the communication unit 11 may send the management device 2 only AR content information on the newly created AR content in the AR content information table in the storage unit 14.

Then, if the control unit 13 is instructed to complete the program in processing of Op. 108 (Op. 108: YES), the control unit 13 completes processing of the position designation program. Otherwise, if the control unit 13 is not instructed to complete the program (Op. 108: NO), the control unit 13 returns to processing of Op. 103.

Figure 18:
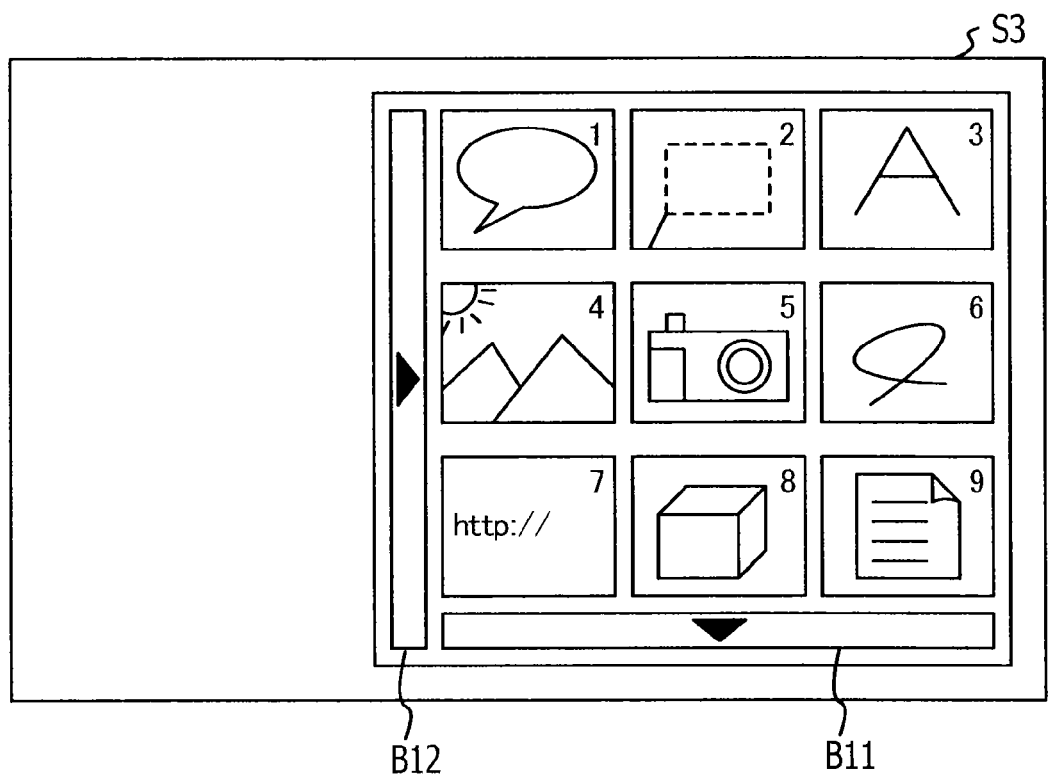
FIG. 18 illustrates an example of a template selection screen.

Here, a template selection screen is described. FIG. 18 illustrates an example of a template selection screen. In the processing of Op. 303 illustrated in FIG. 17, a template selection screen S3 is displayed. On the template selection screen, a group of buttons (a button 1 to a button 9) with which types of AR templates are selectable are displayed. In description of the template selection screen, the template selection screen is described in such a manner that buttons are identified based on numbers depicted in respective button regions. For example, a square button in which a number "1" is depicted is "button 1". Additionally, the template selection screen contains a group of selectable buttons other than the group of buttons depicted in FIG. 18, and contains a scroll button B11 for performing scroll operations for displaying those button groups. Additionally, the template selection screen contains a menu close button B12 for terminating selection of the AR template.

The buttons correspond to respective individual template IDs. That is, template information tables corresponding to respective buttons are provided. Upon input to any button, a template ID corresponding to the button is selected, and a template information table is activated based on the selected template ID.

A speech-bubble type of AR template is associated with the button 1. In the speech-bubble type of AR template, text information is added within a speech-bubble-shaped figure. A box callout type of AR template is associated with the button 2. In the box callout type of AR template, a leader line and a quadrangular figure bonded to the tip of the leader line are included, and text information is added within the quadrangular figure.

A text box type of AR template is associated with the button 3. In the text box type of AR template, text information is added to a quadrangular, frame-like figure. A picture type of AR template is associated with the button 4. In the picture type of AR template, image data is mapped within a quadrangular frame-like figure. An image file stored in the storage unit 14 is used as the image data.

A photographing type of AR template is associated with the button 5. The photographing type of AR template is an AR template similar to the picture type of AR template; however, these types differ in the source from which image data is acquired. When the photographing type of AR template is used, a photographing mode is activated, and image-capturing processing is performed by the imaging unit 12. Using the photographing type of AR template, image data captured by photographing processing is mapped within a quadrangular, frame-like figure. Image data mapped using the picture type of AR template and the photographing type of AR template may be static images or animations.

The button 6 is a handwriting type of AR template. The handwriting type of AR template is a quadrangular, transparent figure, and further the pattern of the figure is edited by a handwriting operation. The button 7 is a link type of AR template, and is a template similar to the text box type of AR template. Upon selection of the link type of AR template, a list of Web pages is displayed, and access information to a Web page selected from the list is added to AR templates. The list of Web pages is acquired, for example, from bookmarks and access history of a web browser.

The button 8 is associated with a figure type of AR template. A three-dimensional stereomodel figure is defined in the figure type of AR template. For example, in response to input to the button 8, a screen display for selection of the shape of the stereomodel figure may be performed. The shape of the stereomodel figure is, for example, a cube, a rectangular parallelepiped, a cylinder, a sphere, a circular cone, a triangular prism, or the like. Additionally, in response to input to the button 8, computer-aided design (CAD) data may be activated. As the CAD data, for example, a file of CAD data stored in the storage unit 14 is selected.

The button 9 is associated with a file type of AR template. The file type of AR template is a quadrangular figure to which an icon image representing a file is mapped. Upon selection of the file type of AR template, a file in the storage unit 14 is selected, and a link to the selected file is added to the AR template.

As is described above, the information processing device 1 in this embodiment utilizes an image-capturing position in the marker coordinate system, thereby enabling AR content to be created simply. That is, the user may associate the arrangement position of an AR object with an image-capturing position in a virtual space by performing operations of image capturing of a reference object at a location where the user wishes to arrange the AR object.

[Second Embodiment]

In the first embodiment, the example in which a point corresponding to the camera origin in the marker coordinate system is utilized as the arrangement position of the AR object has been described. A second embodiment virtually changes the position of the origin in the camera coordinate system, thereby arranging the AR object at a position different from the actual position (image-capturing position) of an imaging device. Note that virtually changing the position of the origin in the camera coordinate system is referred to as setting an offset. Additionally, an offset value may be set for each of Xc, Yc, Zc in the camera coordinate system. For example, if the arrangement position of the AR object is to be changed in a direction of the depth of the camera, an offset value for Zc is given.

Depending on the relationship between a location at which an AR object is to be arranged and the arrangement position of a marker, it is difficult to capture an image of the marker from the position at which the AR object is arranged. For example, the difficulty arises if the marker M is arranged at the front of a device and the AR object is arranged on the back side of the device.

The second embodiment utilizes an offset, and thereby arranges the AR object at a different position from the image-capturing position. A position designation method according to the second embodiment will be described. Note that the functional configuration of the information processing device 1 according to the second embodiment is similar to that in the first embodiment.

For example, after the call for the editing process is performed in Op. 105 illustrated in FIG. 15, the control unit 13 determines whether designation of an offset mode has been accepted from the user, before processing of Op. 301 in the editing process illustrated in FIG. 17. Note that if designation of the offset mode is not accepted, processing similar to that in the first embodiment is performed. Otherwise, if designation of the offset mode has been accepted, processing of transforming the origin Oc of a camera into a temporary camera origin Oc' is performed before processing of Op. 302.

That is, when Xo for the Xc coordinate, Yo for the Yc coordinate, and Zo the Zc coordinate are given as an offset value, the virtual camera origin is (Xo, Yo, Zo). Note that it is assumed that the camera origin is a virtual image-capturing position.

Then, the calculation unit 17 generates the corresponding column vector Ac (Xo, Yo, Zo, 1) using the virtual image-capturing position (Xo, Yo, Zo). Then, by substituting Ac for Formula 3, position information indicating a position in the marker coordinate system corresponding to the virtual image-capturing position is calculated (Op. 302). Note that the rest of the processing is similar to that in the first embodiment.

Here, the offset value may be a value set in advance or a value input by the user. Note that it is determined in advance what length in the real space is equivalent to "1" in each axis in the camera coordinate system. For example, when a 5 cm-cube marker is used as a reference object, "1" in each axis may be made to correspond to 5 cm in the real space, for example.

[Third Embodiment]

In the third embodiment, as in the second embodiment, the position of an AR object is designated utilizing an offset. In the third embodiment, however, an estimated arrangement position of an AR object is displayed as a guidance in order to more facilitate designation of the position of the AR object. While viewing the guidance display, the user can grasp what position the AR object would be arranged at.

Then, at a point of time when the user who has perused the guidance display inputs a determination instruction, the position of the AR object is determined.

Figure 19:
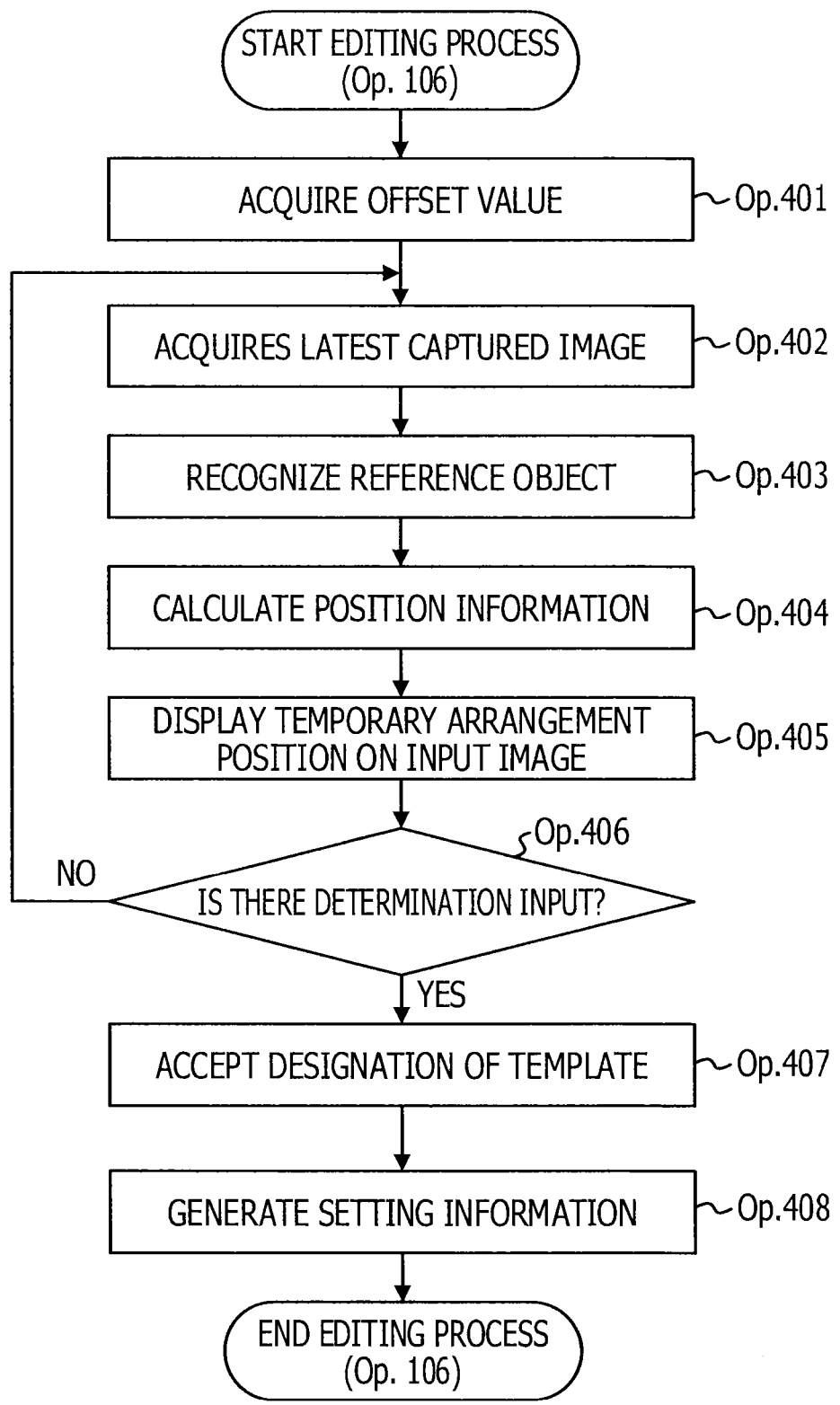
FIG. 19 illustrates an example of a processing procedure of an editing process according to a third embodiment.

An editing process in the position designation process according to the third embodiment will be described with reference to FIG. 19. Note that the functional configuration of the information processing device 1 according to the third embodiment is similar to those in the first embodiment. FIG. 19 illustrates an example of a processing procedure of the editing process according to the third embodiment.

Note that, as in the second embodiment, the control unit 13 performs the following processing if designation of the offset mode has been accepted. If designation of the offset mode is not accepted, processing similar to that in the first embodiment is performed.

The control unit 13 acquires an offset value by accepting input of the offset value by the user, or by acquiring an offset value set in advance from the storage unit 14 (Op. 401). Next, the recognition unit 16 acquires the latest captured image from the buffer of the storage unit 14 (Op. 402). Then, a reference object is recognized from the latest captured image (Op. 403). Then, the recognition unit 16 generates a transformation matrix based on the figure of the reference object.

When the recognition unit 16 generates transformation coordinates, the calculation unit 17 calculates position coordinates utilizing the transformation matrix (Op. 404). Specifically, first, as in the second embodiment, the image-capturing position is transformed from (0, 0, 0) to a virtual image-capturing position. If, as an offset value, values of Xo for the Xc coordinate, Yo for the Yc coordinate, and Zo for the Ac coordinate are acquired, (Xo, Yo, Zo) is calculated as a virtual image-capturing position.

Then, the calculation unit 17 generates a column vector Ac (Xo, Yo, Zo, 1) using the virtual image-capturing position (Xo, Yo, Zo). Then, by substituting Ac for Formula 3, position information indicating a position in the marker coordinate system corresponding to the virtual image-capturing position is calculated.

Next, based on the position information calculated in Op. 404, the image generation unit 19 generates a guidance display screen that displays a temporary arrangement position of the AR object on the captured image acquired in Op. 402 (Op. 405). Then, under control of the image generation unit 19, the display unit 15 displays a guidance display screen.

Figure 20:
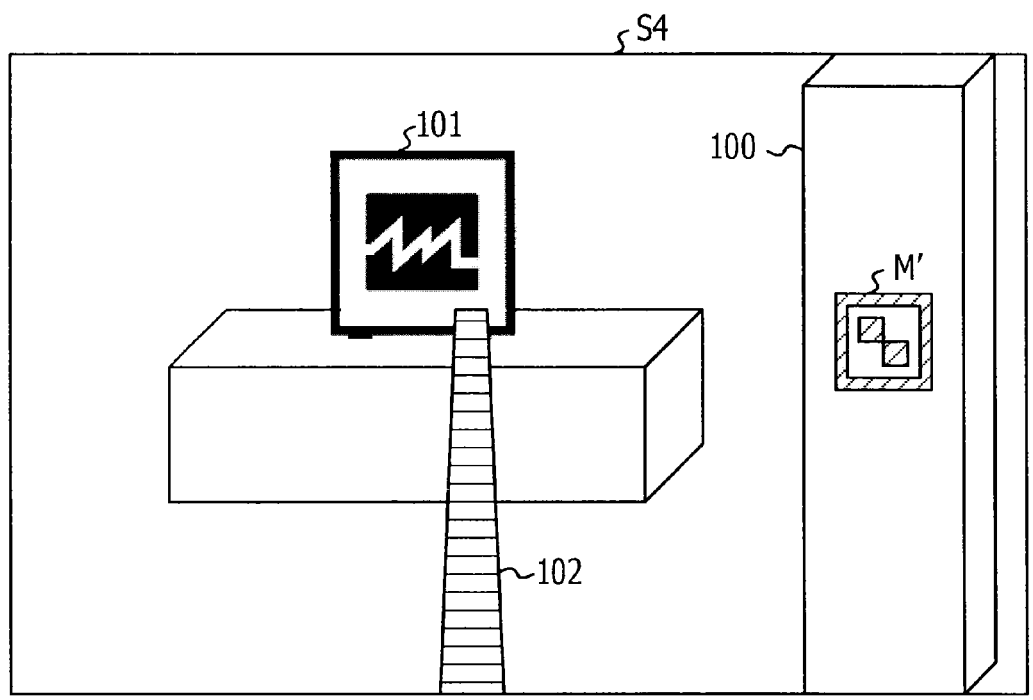
FIG. 20 is an illustration for explaining a guidance display indicating a temporary designated position.

FIG. 20 is an illustration for explaining a guidance display indicating a temporary designated position. A guidance display image S4 illustrated in FIG. 20 is an image in which a guidance display 102 is overlaid on a captured image in which the real space where a pillar 100, a marker M' arranged on the pillar 100, a monitor 101, and so on exist is captured.

The tip of the guidance display 102 is determined based on the position information calculated in Op. 404. The tip position of the guidance display is obtained by transforming the position coordinates (marker coordinate system) designated using position information into the screen coordinate system, as in the case of the projection image of AR content in a combined image. Note that the temporary designated position may be displayed only with the tip portion of the guidance display, or may be displayed in a bar-like shape as illustrated in FIG. 20.

Returning now to FIG. 19, the control unit 13 determines whether determination input from the user has been accepted (Op. 406). Determination input is performed, for example, by pressing a determination button if the determination button is arranged on the display image S4. Additionally, if an image-capturing button is pressed, it may be determined that determination input is performed.

If determination input has not been accepted (Op. 406: No), the control unit 13 instructs the recognition unit 16 to acquire the latest new image (to Op. 402). Otherwise, determination input has been accepted (Op. 406: Yes), the content generation unit 18 accepts selection of a template (Op. 407). Then, the content generation unit 18 generates AR content information including position information calculated by the calculation unit 17 and the template ID of the designated template (Op. 408).

As is described above, according to the third embodiment, the user who creates AR content may confirm the temporary arrangement position of the AR object by using the display screen S4. Then, it is possible to determine the arrangement position of the AR object after checking for a suitable arrangement position.

[Fourth Embodiment]

While the foregoing first embodiment, second embodiment, and third embodiment have been described on the assumption that the information processing device 1 having an imaging device generates AR content information, embodiments are not limited to this.

For example, the management device 2 may generate AR content information. That is, the management device 2 acquires a captured image from the information processing device 1 having an imaging device, and thus performs the position designation process on the assumption that that captured image is an input image.

If the management device 2 performs the position designation process illustrated in the first embodiment and the second embodiment, a captured image may be acquired in real time from the information processing device 1, or may be acquired at a different point of time. Note that a captured image acquired from the information processing device 1 is an image taken at a pint of time that is prior to and is the closest to a point of time of an instruction for image capturing issued by the user.

In contrast, if the management device 2 performs the position designation process illustrated in the third embodiment, the management device 2 appropriately acquires a captured image from the information processing device 1, and sends the display image S4 to the information processing device 1 if the display image S4 is created.

[Example of Hardware Configuration]

Figure 21:
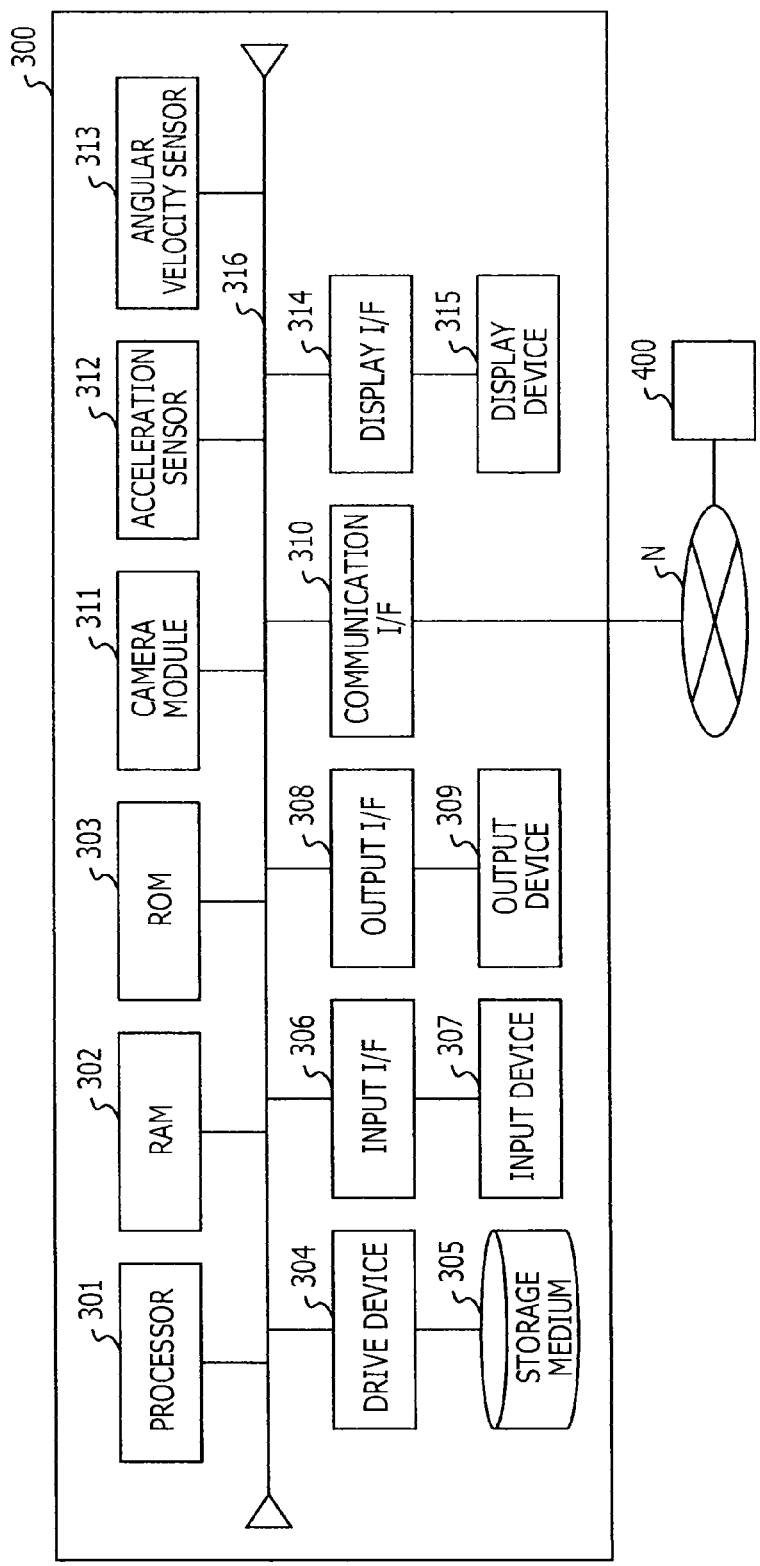
FIG. 21 illustrates an example of a hardware configuration of the information processing device of each embodiment.

The hardware configuration of the information processing device 1 and the management device 2 illustrated in each embodiment will be described. FIG. 21 illustrates an example of a hardware configuration of the information processing device of each embodiment. The information processing device 1 in each embodiment is implemented by a computer 300. The functional blocks illustrated in FIG. 11 are implemented, for example, by the hardware configuration illustrated in FIG. 21. The computer 300 includes, for example, a processor 301, a random access memory (RAM) 302, a read only memory (ROM) 303, a drive device 304, a storage medium 305, an input interface (input I/F) 306, an input device 307, an output interface (output I/F) 308, an output device 309, a communication interface (communication I/F) 310, a camera module 311, an acceleration sensor 312, an angular velocity sensor 313, a display interface (display I/F) 314, a display device 315, a bus 316, and so on. Each piece of hardware is connected through the bus 316.

The communication interface 310 controls communication over the network 3. Communication controlled by the communication interface 310 may be in a manner of accessing the network N through a wireless base station utilizing wireless communication. The input interface 306 is connected to the input device 307, and transmits an input signal received from the input device 307 to the processor 301. The output interface 308 is connected to the output device 309, and performs output to the output device 309 in accordance with an instruction of the processor 301.

The input device 307 is a device that sends an input signal in response to an operation. The input device 307 is, for example, a key device such as a keyboard or a button attached to the main body of the computer 300, a mouse, a pointing device of a touch panel, or the like. The output device 309 is a device that outputs information in accordance with control of the processor 301. The output device 309 is, for example, a sound output device such as a speaker.

The display interface 314 is connected to the display device 315. The display interface 314 causes the display device 315 to display image information that is written to a display buffer provided in the display interface 314 by the processor 301. The display device 315 is a device that outputs information in accordance with control of the processor 301. As the display device 315, an image output device such as a display, a transmissive display, or the like is used.

In the case where a transmissive display is used, a projection image of AR content may be, for example, controlled to be displayed at a suitable position in the transmissive display rather than to be combined with a captured image. This allows the user to obtain visual perception of a state in which the real space and AR content coincide with each other. Additionally, for example, an input-output device, such as a touch screen, is used as the input device 307 as well as the display device 315. Additionally, instead of the input device 307 as well as the display device 315 integrated inside the computer 300, the input device 307 as well as the display device 315 may be connected to the computer 300 from outside thereof, for example.

The RAM 302 is a readable and writable memory device, and a semiconductor memory such as a static RAM (SRAM) or a dynamic RAM (DRAM), or a flash memory other than the RAM, for example, may be used. Examples of the ROM 303 include a programmable ROM (PROM) and so on.

The drive device 304 is a device that performs at least either of reading and writing of information stored in a storage medium 305. The storage medium 305 stores information written by the drive device 304. The storage medium 305 is, for example, at least one of kinds of storage media, such as a hard disk, a solid state drive (SSD), a compact disc (CD), a digital versatile disc (DVD), and a blu-ray disc. Additionally, for example, the computer 300 includes the drive device 304 corresponding to the kind of the storage medium 305 in the computer 300.

The camera module 311 includes an imaging device (image sensor), and, for example, reads a value measured by the imaging device and writes the read value to an input-image image buffer included in the camera module 311. The acceleration sensor 312 measures an acceleration that acts on the acceleration sensor 312. The angular velocity sensor 313 measures an angular velocity of an operation performed by the angular velocity sensor 313.

The processor 301 reads a program stored in the ROM 303 or the storage medium 305 to the RAM 302 and performs processing according to the procedure of the read program. For example, the functions of the control unit 13 are implemented by the processor 301 controlling other hardware based on the position designation program illustrated in FIG. 15. The functions of the communication unit 11 are implemented by the processor 301 controlling the communication interface 310 to perform data communication and to store received data in the storage medium 305.

The functions of the storage unit 14 are implemented by the ROM 303 and the storage medium 305 storing a program file and a data file or by the RAM 302 being used as a work area of the processor 301. For example, AR content information, template information, and so on are stored in the RAM 302.

The functions of the imaging unit 12 are implemented by the camera module 311 writing image data to the input-image image buffer and by the processor 301 reading image data in the input-image image buffer. In a monitoring mode, for example, image data is written to the input-image image buffer and is concurrently written to a display buffer of the display device 315.

Additionally, the functions of the display unit 15 are implemented when image data generated by the processor 301 is written to the display buffer included in the display interface 314 and the display device 315 displays image data in the display buffer.

Figure 22:
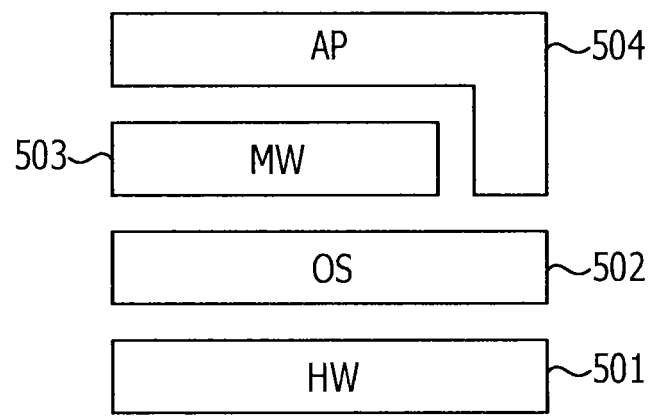
FIG. 22 illustrates an example of a configuration of programs that operate on a computer 300.

Next, FIG. 22 illustrates an example of a configuration of programs that operate on the computer 300. On the computer 300, an operating system (OS) 502 that controls a hardware group operates. The processor 301 operates in a procedure in accordance with the OS 502 to perform control and management of hardware (HW) 501, so that processing by an application program (AP) 504 or middleware (MW) 503 is performed on the HW 501.

On the computer 300, programs such as the OS 502, the MW 503, and the AP 504 are, for example, read to the RAM 302 and are executed by the processor 301. Additionally, the AR control program including the position designation program illustrated in each embodiment is, for example, a program activated as the MW 503 from the AP 504.

Alternatively, for example, the AR control program including the position designation program is a program that implements the AR function as the AP 504. The AR control program is stored in the storage medium 305. The storage medium 305 in such a state that the position designation program according to the present embodiments is singly stored or the AR control program including the position designation program is stored may be circulated separately from the main body of the computer 300.

Figure 23:
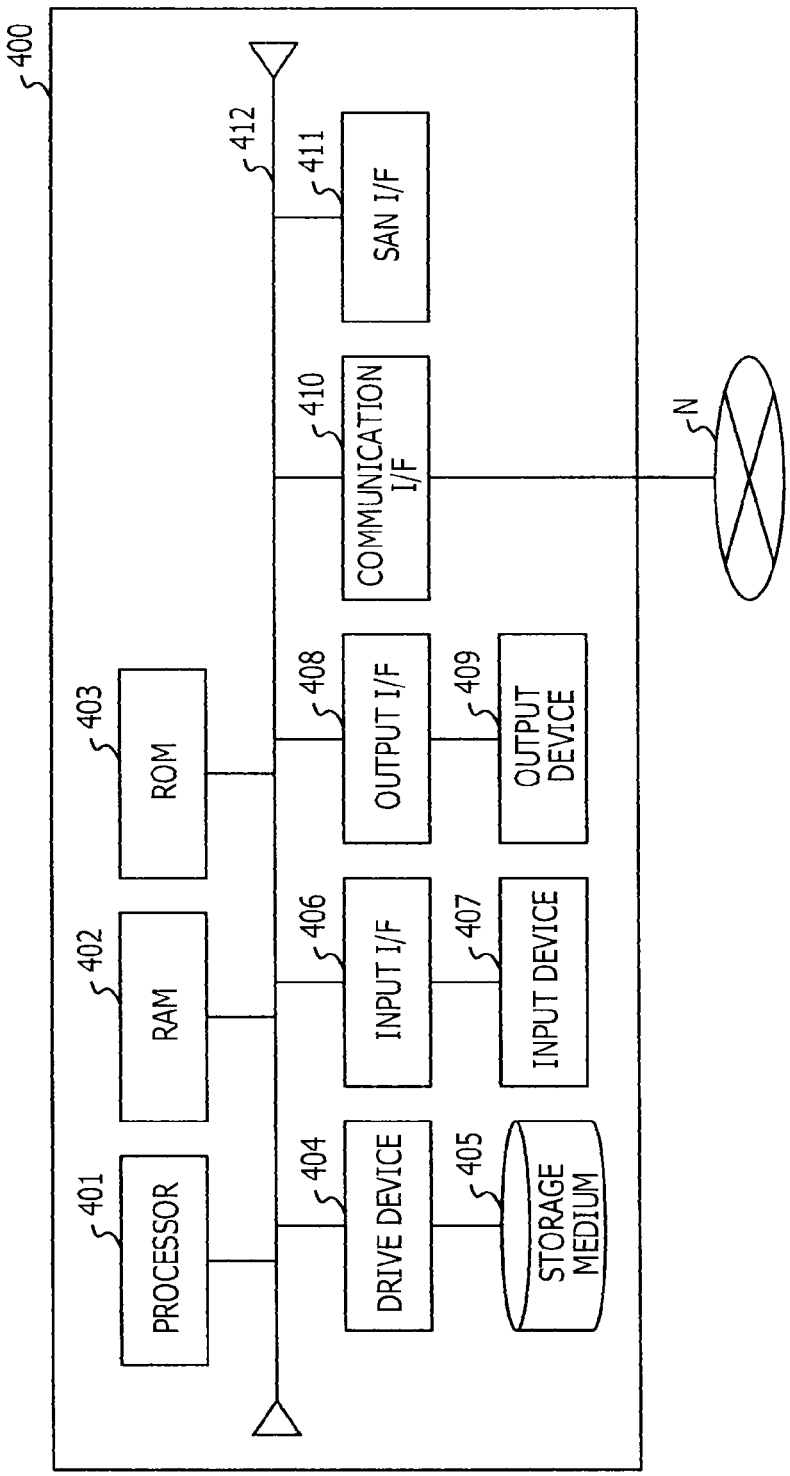
FIG. 23 is an example of a hardware configuration of a management device of each embodiment.

Next, a hardware configuration of the management device 2 in each embodiment will be described. FIG. 23 is an example of a hardware configuration of the management device of each embodiment. The management device 2 is implemented by a computer 400.

The management device 2 is implemented, for example, by the hardware configuration illustrated in FIG. 23. The computer 400 includes, for example, a processor 401, a RAM 402, a ROM 403, a drive device 404, a storage medium 405, an input interface (input I/F) 406, an input device 407, an output interface (output I/F) 408, an output device 409, a communication interface (communication I/F) 410, a storage interface network (SAN) 411, a bus 412, and so on. Each piece of hardware is connected through the bus 412.

For example, the processor 401 is hardware similar to the processor 301. The RAM 402 is, for example, hardware similar to the RAM 302. The ROM 403 is, for example, hardware similar to the ROM 303. The drive device 404 is, for example, hardware similar to the drive device 304. The storage medium 405 is, for example, hardware similar to the storage medium 305. The input interface (input I/F) 406 is, for example, hardware similar to the input interface (input I/F) 306. The input device 407 is, for example, hardware similar to the input device 307.

The output interface (output I/F) 408 is, for example, hardware similar to the output interface (output I/F) 308. The output device 409 is, for example, hardware similar to the output device 309. The communication interface (communication I/F) 410 is, for example, hardware similar to the communication interface (communication I/F) 310. The storage interface network (SAN) 411 is an interface for connecting the computer 400 to the SAN and includes a host bus adapter (HBA).

The processor 401 reads a management program stored in the ROM 403 or the storage medium 405 to the RAM 402 and performs processing according to the procedure of the read management program. At that point, the RAM 402 is used as a work area of the processor 401. Note that the management program includes a position designation program according to the position designation process in the management device 2.

The ROM 403 and the storage medium 405 store a program file and a data file, or the RAM 402 is used as a work area of the processor 401, so that the management device 2 stores a various kinds of information. Additionally, the processor 401 controls the communication interface 410 to perform communication processing.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An information processing device, comprising:
a memory; and
a processor coupled to the memory and configured to:
calculate, based on an augmented reality (AR) marker that is recognized from a first input image, position information with respect to the AR marker, the position information indicating an image-capturing position of the first input image and the image-capturing position being represented in real space;
store AR marker information in a marker management table, the AR marker information including a marker ID of the AR marker, real space coordinates of the AR marker, and a content addition flag for the AR marker; and
generate setting information in which display data is associated with the position information with respect to the AR marker as a display position of the display data, wherein
the display data is displayed based on the setting information when the AR marker is recognized from a second input image that is different from the first input image.

2. The information processing device according to claim 1, wherein
the position information is a three-dimensional position in a three-dimensional space with respect to the AR marker, and the three-dimensional space is the real space.

3. The information processing device according to claim 1, wherein
the processor is further configured to acquire an offset value for adjusting the image-capturing position, and
the position information corresponding to the image-capturing position is calculated, based on the offset value and the figure of the reference object.

4. The information processing device according to claim 3, wherein
the processor is further configured to display a guidance display indicating the position information to which the offset value is applied, on the first input image, and
the setting information containing the position information is generated, when a determination instruction is input from a user, the determination instruction indicating that the offset value is to be finally determined by a user.

5. The information processing device according to claim 1, wherein the processor is further configured to:
acquire the second input image;
recognize the AR marker from the second input image; and
generate, based on the setting information, image data for displaying the display data at a specific position relative to the AR marker in the second input image.

6. The information processing device according to claim 1, wherein the generated setting information includes information to designate a position of the display data, an orientation of the display data, and a size of the display data.

7. The information processing device according to claim 1, wherein
the processor is further configured to store a template information table including template information for defining each template that is applied as model data of an AR object, and
the template information includes a template ID and coordinate information of each vertex of the template, the coordinate information being in the real space coordinates.

8. A position designation method executed by a computer, the position designation method comprising:
calculating, based on an augmented reality (AR) marker that is recognized from a first input image, position information with respect to the AR marker, the position information indicating an image-capturing position of the first input image and the image-capturing position being represented in real space;
storing AR marker information in a marker management table, the AR marker information including a marker ID of the AR marker, real space coordinates of the AR marker, and a content addition flag for the AR marker; and
generating, by a processor, setting information in which display data is associated with the position information with respect to the AR marker as a display position of the display data, wherein
the display data is displayed based on the setting information when the AR marker is recognized from a second input image that is different from the first input image.

9. The position designation method according to claim 8, wherein
the position information is a three-dimensional position in a three-dimensional space with respect to the AR marker, and
the three-dimensional space is the real space.

10. The position designation method according to claim 8, further comprising:
acquiring an offset value for adjusting the image-capturing position, wherein
the position information corresponding to the image-capturing position is calculated, based on the offset value and the figure of the AR marker.

11. The position designation method according to claim 10, further comprising:
displaying a guidance display indicating the position information to which the offset value is applied, on the first input image, wherein
the setting information containing the position information is generated, when a determination instruction is input from a user, the determination instruction indicating that the offset value is to be finally determined by a user.

12. The position designation method according to claim 8, further comprising:
acquiring the second input image;
recognizing the AR marker from the second input image; and
generating, based on the setting information, image data for displaying the display data at a specific position relative to the AR marker in the second input image.

13. The position designation method according to claim 8, further comprising:
storing a template information table including template information for defining each template that is applied as model data of an AR object, wherein
the template information includes a template ID and coordinate information of each vertex of the template, the coordinate information being in the real space coordinates.

14. A non-transitory computer-readable storage medium storing a program for causing a computer to execute a process, the process comprising:
calculating, based on an augmented reality (AR) marker that is recognized from a first input image, position information with respect to the AR marker, the position information indicating an image-capturing position of the first input image and the image-capturing position being represented in real space;
storing AR marker information in a marker management table, the AR marker information including a marker ID of the AR marker, real space coordinates of the AR marker, and a content addition flag for the AR marker; and
generating setting information in which display data is associated with the position information with respect to the AR marker as a display position of the display data, wherein
the display data is displayed based on the setting information when the AR marker is recognized from a second input image that is different from the first input image.

15. The non-transitory computer-readable storage medium according to claim 14, wherein
the position information is a three-dimensional position in a three-dimensional space with respect to the AR marker, and
the three-dimensional space is the real space.

16. The non-transitory computer-readable storage medium according to claim 14, the process further comprising:
acquiring an offset value for adjusting the image-capturing position, wherein the position information corresponding to the image-capturing position is calculated, based on the offset value and the figure of the AR marker.

17. The non-transitory computer-readable storage medium according to claim 16, the process further comprising:
displaying a guidance display indicating the position information to which the offset value is applied, on the first input image, wherein
the setting information containing the position information is generated, when a determination instruction is input from a user, the determination instruction indicating that the offset value is to be finally determined by a user.

18. The non-transitory computer-readable storage medium according to claim 14, the process further comprising:
acquiring the second input image;
recognizing the AR marker from the second input image; and
generating, based on the setting information, image data for displaying the display data at a specific position relative to the AR marker in the second input image.

19. The non-transitory computer-readable storage medium according to claim 14, the process further comprising:
storing a template information table including template information for defining each template that is applied as model data of an AR object, wherein
the template information includes a template ID and coordinate information of each vertex of the template, the coordinate information being in the real space coordinates.

* * * * *